US012791850B2

(12) United States Patent
Komiyama

(10) Patent No.: US 12,791,850 B2
(45) Date of Patent: Nov. 10, 2026

(54) OPTICAL SYSTEM, OPTICAL ELEMENT, IMAGE PICKUP APPARATUS, AND LENS APPARATUS

(71) Applicant: CANON KABUSHIKI KAISHA, Tokyo (JP)

(72) Inventor: Takahiro Komiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 18/679,504

(22) Filed: May 31, 2024

(65) Prior Publication Data

US 2024/0411125 A1 Dec. 12, 2024

(30) Foreign Application Priority Data

Jun. 7, 2023 (JP) ................................ 2023-093642

(51) Int. Cl.

*G02B 26/06* (2006.01)
*B82Y 20/00* (2011.01)
*G02B 1/00* (2006.01)
*G02B 13/18* (2006.01)

(52) U.S. Cl.

CPC .............. *G02B 26/06* (2013.01); *B82Y 20/00* (2013.01); *G02B 1/002* (2013.01); *G02B 13/18* (2013.01)

(58) Field of Classification Search

CPC .............. G02B 51/1809; G02B 13/004; G02B 13/0045
USPC .......................................................... 359/291
See application file for complete search history.

(56) References Cited

U.S. PATENT DOCUMENTS

| | | | | |
|---|---|---|---|---|
| 9,995,930 | B2 * | 6/2018 | Arbabi | G02B 27/4272 |
| 10,790,325 | B2 * | 9/2020 | Arbabi | H10F 39/8023 |
| 11,789,247 | B2 | 10/2023 | Komiyama | |
| 2011/0069377 | A1 * | 3/2011 | Wu | G02B 1/007 359/356 |
| 2019/0049732 | A1 * | 2/2019 | Lee | G02B 27/0081 |
| 2019/0154877 | A1 | 5/2019 | Capasso | |
| 2020/0292809 | A1 | 9/2020 | Arbabi | |
| 2021/0028215 | A1 * | 1/2021 | Devlin | H10F 39/806 |
| 2021/0132256 | A1 * | 5/2021 | Park | G02B 5/1871 |
| 2021/0149081 | A1 | 5/2021 | Groever | |
| 2021/0247549 | A1 * | 8/2021 | Park | G02B 1/002 |
| 2021/0307608 | A1 * | 10/2021 | Hu | A61B 3/14 |

(Continued)

FOREIGN PATENT DOCUMENTS

| | | |
|---|---|---|
| JP | 2021-071727 A | 5/2021 |
| WO | 2023/061865 A1 | 4/2023 |

OTHER PUBLICATIONS

Combined Search Report and Examination Report issued in corresponding GB Patent Application No. 2408050.9, dated Oct. 18, 2024, pp. 1-8.

(Continued)

*Primary Examiner* — Lin Ye
(74) *Attorney, Agent, or Firm* — Carter, DeLuca & Farrell LLP

(57) ABSTRACT

An optical system includes at least one lens, and a meta-lens having a lens surface that generates a phase change in a wavefront of light passing through the meta-lens. A phase function of the lens surface, representing a phase change amount on the wavefront corresponding to a position in a radial direction of the meta-lens, includes an inflection point.

21 Claims, 17 Drawing Sheets

(56) References Cited

U.S. PATENT DOCUMENTS

2022/0082731 A1* 3/2022 Mun .................... G02B 1/002

OTHER PUBLICATIONS

Combined Search and Examination Report issued in corresponding UK Patent Application No. GB2603621.0, dated Aug. 14, 2026, pp. 1-8.

* cited by examiner

OPTICAL SYSTEM, OPTICAL ELEMENT, IMAGE PICKUP APPARATUS, AND LENS APPARATUS

BACKGROUND

Technical Field

One of the aspects of the embodiments relates generally to an optical system, and more particularly to an optical system suitable for digital video cameras, digital still cameras, broadcasting cameras, film-based cameras, surveillance cameras, in-vehicle (on-board) cameras, distance measuring cameras, and the like.

Description of Related Art

Optical systems for image pickup apparatuses have recently been demanded to have reduced sizes. Japanese Patent Laid-Open No. 2021-71727 discloses an optical system having a so-called meta-lens having positive refractive power.

The meta-lens disclosed in Japanese Patent Laid-Open No. 2021-71727 corrects chromatic aberration, but its refractive power is small and cannot share the refractive power of another lens. Therefore, the effect of correcting various aberrations, such as spherical aberration, coma, curvature of field, astigmatism, and distortion, other than chromatic aberration by the meta-lens disclosed in Japanese Patent Application Laid-Open No. 2021-71727 is limited. In addition, the meta-lens disclosed in Japanese Patent Laid-Open No. 2021-71727 has a phase function that monotonically decreases from the center to the periphery, but the refractive power monotonically increases from the center to the periphery, and thus spherical aberration, curvature of field, and astigmatism are likely to occur. The phase function is a function that expresses a phase change amount in the wavefront of light passing through the meta-lens corresponding to a radial position of the meta-lens (a phase change amount of the wavefront before and after the light passes through the meta-lens). As described above, the optical system disclosed in Japanese Patent Laid-Open No. 2021-71727 has difficulty in satisfactorily correcting various aberrations other than chromatic aberration from the image center to the image periphery.

SUMMARY

An optical system according to one aspect of the disclosure includes at least one lens, and a meta-lens having a lens surface that generates a phase change in a wavefront of light passing through the meta-lens. A phase function of the lens surface, representing a phase change amount on the wavefront corresponding to a position in a radial direction of the meta-lens, includes an inflection point.

An optical system according to another aspect of the disclosure includes at least one lens, and a meta-lens having a lens surface that generates a phase change in a wavefront of light passing through the meta-lens. The lens surface includes a structure that includes a plurality of convex portions. A size of each convex portion changes in a radial direction according to a predetermined rule.

An optical system according to another aspect of the disclosure includes at least one lens, and a meta-lens having a lens surface that generates a phase change in a wavefront of light passing through the meta-lens. A phase function of the lens surface, representing a phase change amount on the wavefront corresponding to a position in a radial direction of the meta-lens, includes a critical point in a peripheral portion in the radial direction.

An optical element according to another aspect of the disclosure includes a lens surface that generates a phase change in a wavefront of light passing through the optical element. A phase function of the lens surface, representing a phase change amount on the wavefront corresponding to a position in a radial direction of the lens surface, includes an inflection point.

An image pickup apparatus and a lens apparatus each having one of the above optical systems also constitutes another aspect of the disclosure.

Further features of various embodiments of the disclosure will become apparent from the following description of embodiments with reference to the attached drawings.

DESCRIPTION OF THE EMBODIMENTS

Figure 1:
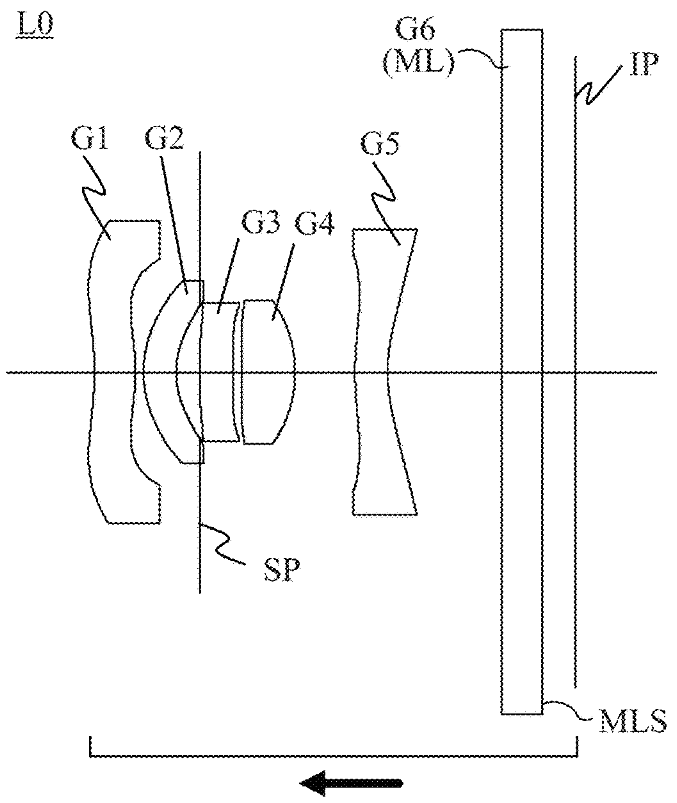
FIG. 1 is a sectional view of an optical system according to Example 1 in an in-focus state at infinity.
Figure 2:
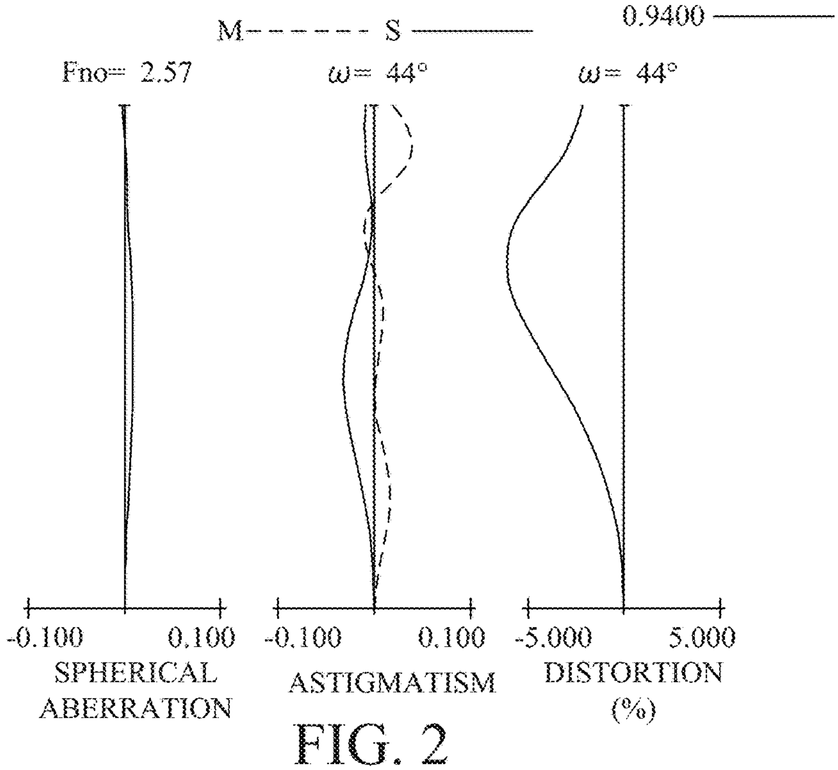
FIG. 2 is a longitudinal aberration diagram of the optical system according to Example 1 in the in-focus state at infinity.

Referring now to the accompanying drawings, a detailed description will be given of embodiments according to the disclosure. Corresponding elements in respective figures will be designated by the same reference numerals, and a duplicate description thereof will be omitted.

FIGS. 1, 6, 10, and 14 are sectional views of optical systems L0 according to Examples 1 to 4 in an in-focus state at infinity. The optical system L0 according to each example is used for a lens apparatus and an image pickup apparatus such as a digital video camera, a digital still camera, a broadcasting camera, a film-based camera, a surveillance camera, an in-vehicle camera (on-board camera), and a distance measuring camera, and an interchangeable lens.

In each sectional view, a left side is an object side, and a right side is an image side. In a case where the optical system L0 according to each example is used in an optical apparatus such as a projector, the left side is a screen side and the right side is a projected image side.

Each arrow illustrated in each sectional view represents a moving direction of a lens during focusing from infinity to a short (or close) distance. In each example, the entire optical system L0 moves from the image side to the object side during focusing. Focusing may be performed by moving only a part of the lenses in the optical system L0 from the image side to the object side or from the object side to the image side.

In each sectional view, SP represents an aperture stop (diaphragm). IP represents an image plane. In a case where the optical system L0 according to each example is used as an imaging optical system in a digital still camera or a digital video camera, an imaging surface of a solid-state image sensor (photoelectric conversion element) such as a CCD sensor or a CMOS sensor is placed on the image plane IP. In a case where the optical system L0 according to each example is used as an imaging optical system of a film-based camera, a photosensitive surface corresponding to the film surface is placed on the image plane IP. FL represents an optical block corresponding to an optical filter, a face plate, a crystal low-pass filter, an infrared cut filter, and the like.

The optical system L0 according to each example includes at least one (one or more) lenses and a meta-lens (optical element) ML. In this example, the meta-lens ML has a lens surface MLS that is at least one of a lens surface on the object side and a lens surface on the image side. The lens surface MLS has a subwavelength structure including a plurality of columnar structures (convex portions) of subwavelength sizes, and causes a phase change in the wavefront of light passing through the lens surface MLS along the light traveling direction.

Figure 19A:
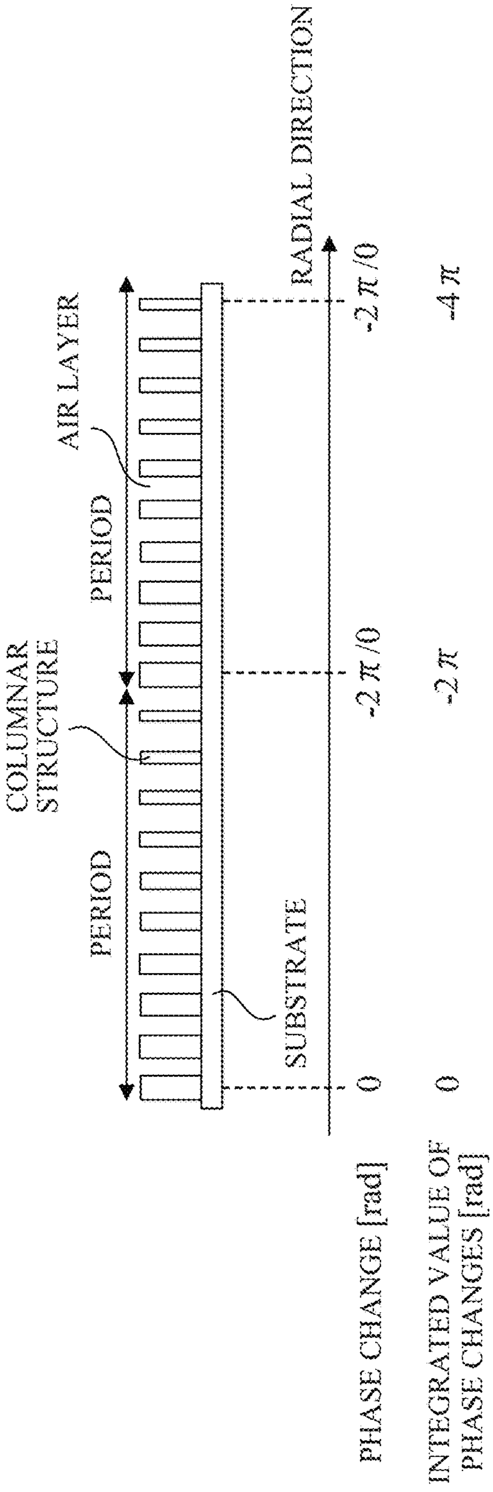
FIGS. 19A and 19B are schematic diagrams of subwavelength structures of meta-lenses.
Figure 19B:
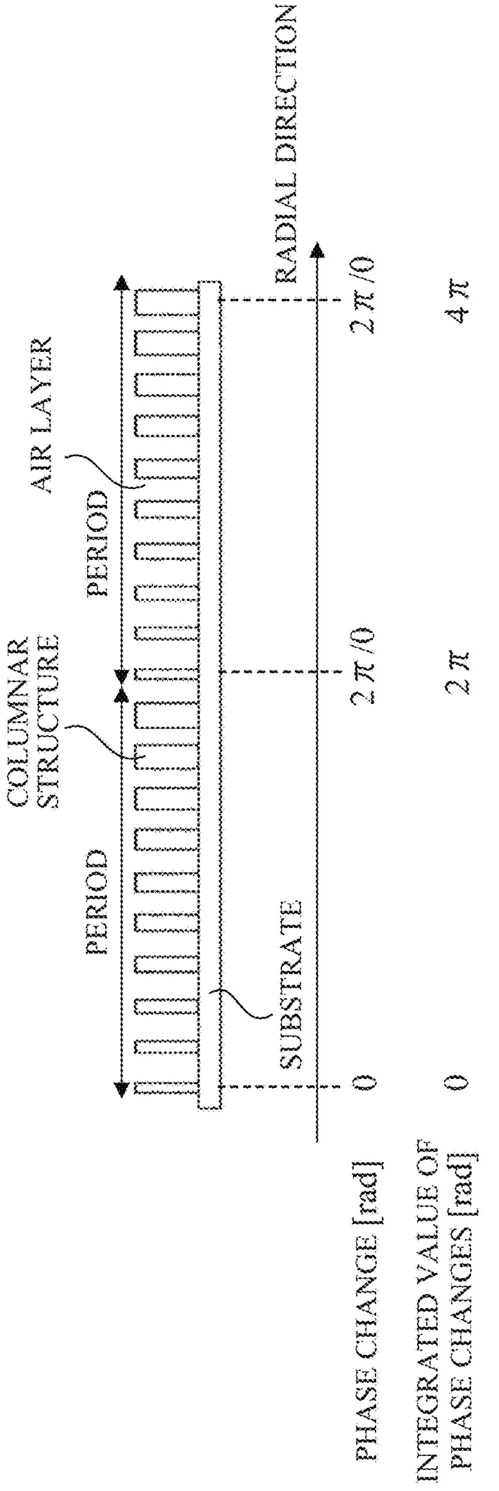

A description will now be given of a principle by which rays are refracted by the subwavelength structure of the meta-lens ML. FIGS. 19A and 19B are schematic diagrams of the subwavelength structure of the meta-lens ML. In the subwavelength structure, the columnar structures are provided on a substrate surface so that the size (thickness) of the subwavelength columnar structure changes in the radial direction of the lens surface according to a predetermined rule. The substrate may be flat or curved. The size of each columnar structure is approximately equal to or smaller than a designed wavelength. Each columnar structure is invisible to light, and under approximation, the columnar structures behave as an average effective medium in which the refractive index of air and the refractive index of the materials of the columnar structures are averaged. In this case, as the size of the columnar structure increases, the refractive index of the effective medium becomes closer to the refractive index of the material of the columnar structure. As the size of the columnar structure reduces, the ratio of the columnar structure to air (filling rate) reduces and the refractive index becomes closer to the refractive index of air. A similar effect can be obtained even if the space between the columnar structures is filled with an arbitrary medium instead of air, so the medium that fills the space between the columnar structures is not limited to air.

Thus, changing the size of the columnar structure in the radial direction can provide an effect that continuously changes the refractive index of the effective medium in the radial direction. That is, under approximation, the meta-lens ML can be regarded as a type of refractive index distribution type lens whose refractive index changes in the radial direction. In a case where the refractive index is different, the optical distance changes even with the same thickness, so a phase change amount of the wavefront of the light before and after passing through the meta-lens ML changes according to the refractive index of the effective medium. In the meta-lens ML, the size of the columnar structure changes in the radial direction, so the phase change amount differs at each position in the radial direction. That is, for example, in a case where a plane wave (parallel light beam) having an aligned phase enters the meta-lens ML, the phase of the wavefront of the plane wave shifts according to the phase change amount at each position in the radial direction of the meta-lens ML. As a result, the meta-lens ML acts as a lens that converges or diverges plane waves. This example has described the example of a plane wave for simplicity, but the meta-lens ML can function as a lens that converges or diverges light using a similar principle for the wavefront of light that is not a plane wave.

FIGS. 2, 7, 11, and 15 are aberration diagrams of the optical systems according to Examples 1 to 4 in the in-focus state at infinity, respectively.

In the spherical aberration diagram, Fno represents an F-number. The spherical aberration diagram illustrates a spherical aberration amount for a designed wavelength (the designed wavelength in each example is illustrated separately). In an astigmatism diagram, S indicates an astigmatism amount on a sagittal image plane, and M indicates an astigmatism amount on the meridional image surface. A distortion diagram illustrates a distortion amount for the designed wavelength.

A description will now be given of the characteristic structure of the optical system L0 according to each example.

A phase function Φ(h) of the lens surface MLS includes at least one of a critical point and an inflection point. The phase function φ(h) is a function representing a phase change amount in the wavefront of light passing through the meta-lens ML corresponding to a position h in the radial direction of the meta-lens ML (phase change amount of the wavefront of light before and after passing through the meta-lens or an integrated value of phase changes). As described above, the meta-lens surface MLS causes a phase change in the wavefront of light passing through the meta-lens ML due to the subwavelength structure. In a case where a phase change amount on the optical axis is set to 0, a phase change occurs at the position h in the radial direction relative to the optical axis, as illustrated in FIGS. 19A and 19B. In the following description, unless otherwise specified, a phase change amount represents a relative phase change amount in a case where the phase change amount on the optical axis is set to 0, and the phase is expressed in the arc degree method (radian, radian, rad). A critical point is a point where the first-order derivative of the phase function φ(h) has a value of 0, and the sign of the value of the first-order derivative of the phase function φ(h) changes before and after that point. An inflection point is a point where the second-order derivative of the phase function φ(h) has a value of 0, and the sign of the value of the second-order derivative of the phase function φ(h) changes before and after that point.

In FIG. 19A, in the subwavelength structure of the lens surface MLS, the columnar structures are provided on the substrate surface so that the size (thickness) of the columnar structure increases as a position moves away from the center of the optical axis at the left end (the center of the lens surface MLS) in the radial direction of the lens surface MLS. A change in which the size of the columnar structure increases as a position moves away from the center of the optical axis increases in the radial direction of the lens surface MLS is periodically repeated along the radial direction of the lens surface MLS, where one period is defined as a period until the phase change amount reaches −2π. A wavefront with a phase change of −2π is continuously connected to a wavefront with a phase change of 0, so in order to generate a phase change smaller than −2π (having a large absolute value), the arrangement by one period may be repeated again in order from the columnar structure with a phase change of actually 0. Thus, repeating the phase change from 0 to 2π can provide an arbitrary negative phase change amount. As illustrated in FIG. 19A, in a case where the columnar structure is provided, the phase function starts with 0 and takes a negative value, so the meta-lens surface MLS has positive refractive power near the optical axis.

In FIG. 19B, in the subwavelength structure on the lens surface MLS, the columnar structures are provided on the surface of the substrate so that the size (thickness) of the columnar structure becomes smaller as a position moves away from the center of the optical axis at the left end (the center of the lens surface MLS) in the radial direction of the lens surface MLS. A change in which the size of the columnar structure increases as a position moves away from the center of the optical axis increases in the radial direction of the lens surface MLS is periodically repeated along the radial direction of the lens surface MLS. At this time, as in the case of FIG. 19A, an arbitrary positive phase change amount can be obtained by repeating a phase change from 0 to 2π, and the meta-lens surface MLS has negative refractive power near the optical axis.

As described above, the phase function φ(h) expresses the positive or negative phase change amount as an integrated value of phase changes from the center of the optical axis. The reference for setting the value of the phase function φ(h) to 0 does not necessarily have to be the center of the optical axis, and in fact, there may be uncertainty equal to a constant. This example assumes an axially symmetrical optical system, and thus the phase function is also expressed as axially symmetrical, but in a non-axially symmetrical optical system, the phase function does not need to be axially symmetrical either.

A description will now be given of a relationship between the phase change amount and the columnar structure. As described above, in a case where the ratio of the columnar structures (filling rate) changes according to the size of the columnar structure, the effective refractive index of the effective medium changes and a phase change occurs. The phase change amount in the columnar structure can be obtained by performing electromagnetic field analysis, for example, based on rigorous coupled-wave analysis (RCWA), finite difference time domain method (FDTD), etc.

Figure 20A:
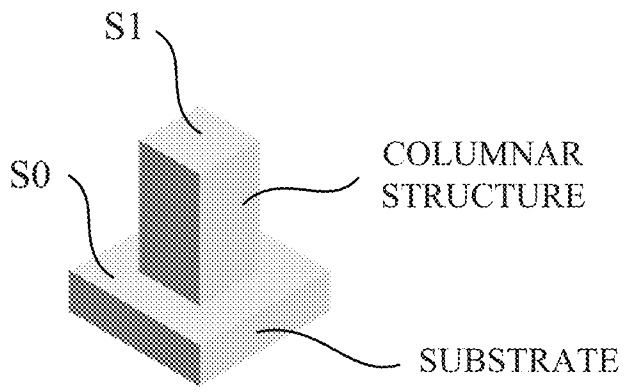
FIGS. 20A and 20B explain a columnar structure of a prism.
Figure 20B:
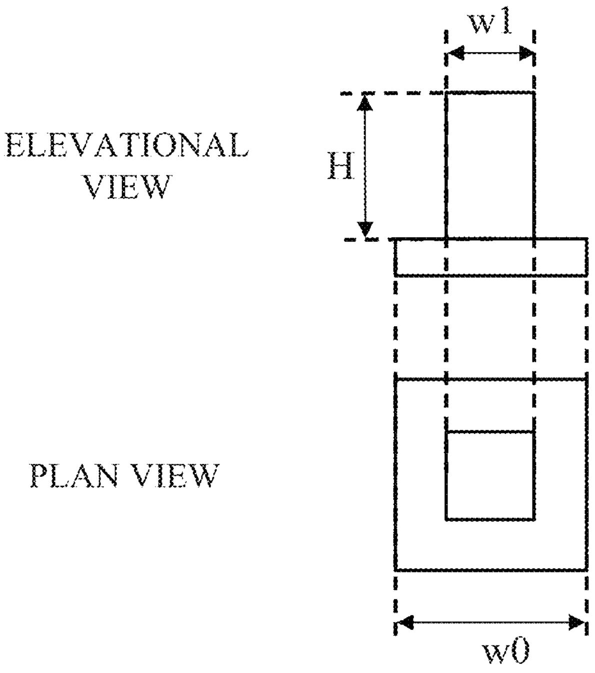

A description will now be given of a definition of filling rate F. FIG. 20A schematically illustrates a unit cell (a set of a single columnar structure and a corresponding substrate) virtually cut out from the continuous structure illustrated in FIGS. 19A and 19B. FIG. 20B is an elevational view and a plan view of the unit cell illustrated in FIG. 20A.

Figure 21A:
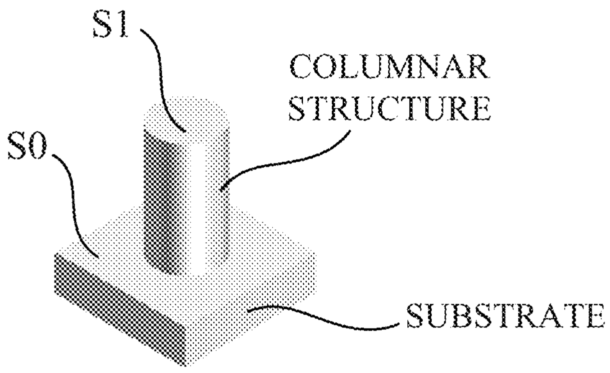
FIGS. 21A and 21B explain a columnar structure of a cylinder.
Figure 21B:
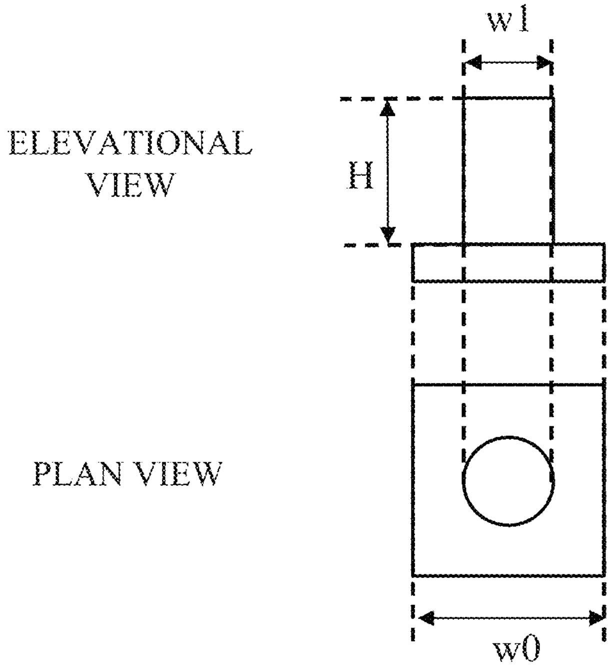
Figure 22A:
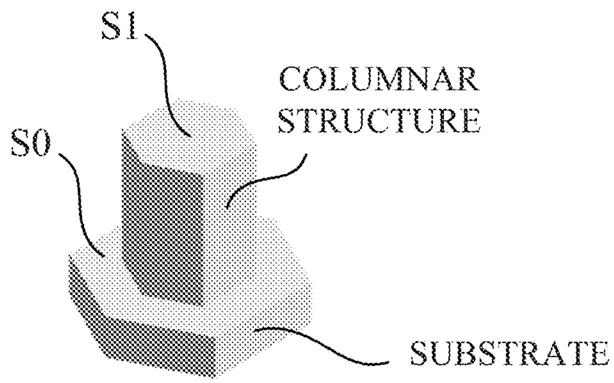
FIGS. 22A and 22B explain a columnar structure of a hexagon.
Figure 22B:
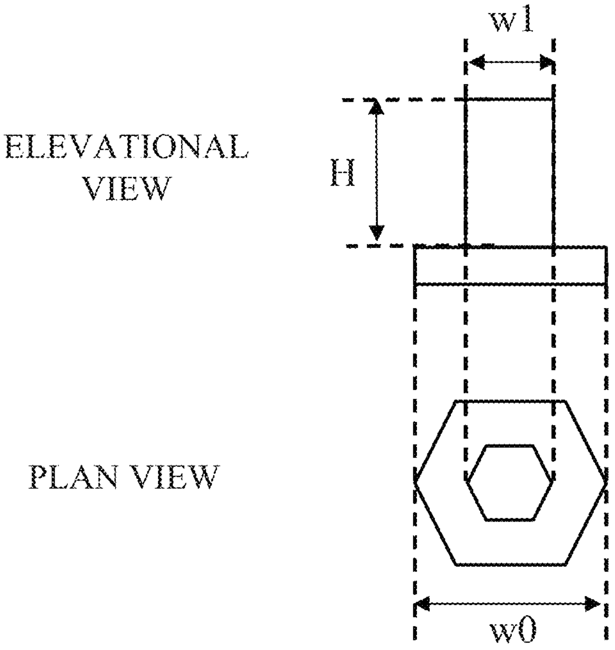

The columnar structure illustrated in FIGS. 20A and 20B is a quadrangular prism (quadratic prism) with a square bottom. Now assume that S0 is the area of the substrate of the unit cell, S1 is the base area of the columnar structure (the area occupied by the columnar structure on the substrate), and H is the height of the columnar structure. At this time, the filling rate F is (S1×H)/(S0×H). The area S0 and the base area S1 are w0×w0 and w1×w1, respectively. That is, in generalization, the filling rate is defined as a ratio of the volume of the columnar structure in the volume of the space of the height H on the substrate of the unit cell. According to this definition, the filling rate can be calculated even if it is not necessarily a column. For example, the filling rate can also be calculated for a columnar structure whose bottom surface is a circle illustrated in as FIGS. 21A and 21B, and a columnar structure whose bottom surface is a regular hexagon as illustrated in FIGS. 22A and 22B. In the columnar structure illustrated in FIGS. 21A and 21B, the filling rate F is (S1×H)/(S0×H). The area S0 and the base area S1 are w0×w0 and (π×w1×w1)/4, respectively. In the columnar structure illustrated in FIGS. 22A and 22B, the filling rate F is (S1×H)/(S0×H). The area S0 and the base area S1 are {3×(√3)×w0×w0}/8 and {3×(√3)×w1×w1}/8, respectively.

The columnar structure illustrated in FIGS. 20 to 22 is a cylindrical column having two similar and parallel planar figures on the top and bottom surfaces, but in reality, the two planar figures may not be completely similar or the top and bottom surfaces may not be completely parallel. Even in such a case, the effective refractive index of the effective medium can be controlled from the viewpoint of the filling rate described above.

The substrates for the unit cells of FIGS. 20 to 22 actually exist as a single substrate when viewed from the entire meta-lens ML, and the columnar structures are provided on the substrate.

In FIGS. 20 to 22, the center of the substrate in the unit cell and the center of the columnar structure substantially coincide with each other, but this example is not limited to this implementation.

The shape of the columnar structure is not limited to one of the shapes illustrated in FIGS. 20 to 22. For example, the shape of the columnar structure may be a prism with a polygonal bottom surface, a prism with a trapezoidal bottom surface, a prism with a convex bottom surface, a prism with a substantially regular polygonal bottom surface, a prism with an L-shaped bottom surface, or the like.

A description will now be given of an effect that the phase function φ(h) of the meta-lens surface MLS includes at least one of a critical point and an inflection point.

In a case where the phase function φ(h) has a critical point, there is an effect of significantly changing the refractive power at the center of the lens surface MLS and the refractive power at the periphery, or changing its sign. For example, as in Examples 1 and 4, in a case where an aspherical lens is used on the front side of the optical system L0 or near the aperture stop SP, the refractive power of the aspherical lens is increased and the size is reduced, and spherical aberration and coma can be corrected. However, in this case, curvature of field and astigmatism tend to undulate from the center to the periphery of the image (image surface). At this time, placing a meta-lens whose phase function φ(h) has a critical point can satisfactorily correct the undulate aberration by utilizing a difference in refractive power between the center and the periphery.

In a case where the phase function φ(h) has an inflection point, there is an effect of making the refractive power at the periphery smaller than the refractive power at the center of the lens surface MLS. For example, as in Examples 2 and 3, by increasing the refractive power near the center of the lens surface MLS, the size of the lens can be reduced, the refractive power at the periphery is relatively reduced, and a light beam at the periphery can be gently refracted relative to a light beam near the center. Thereby, spherical aberration and coma can be effectively corrected.

Disposing the meta-lens ML whose phase function φ(h) has a critical point and an inflection point, on the object side of the aperture stop SP can effectively correct distortion because the refractive power of the lens surface MLS can be significantly changed at a position where an on-axis light beam and an off-axis light beam are separated in the radial direction.

As described above, since the phase function φ(h) of the meta-lens surface MLS includes at least one of a critical point and an inflection point, various aberrations of the optical system L0 can be satisfactorily corrected. An attempt to obtain the above effect only with an aspherical lens causes the thickness of the optical system L0 to increase by the amount of the aspherical lens, but using the meta-lens ML minimizes an increase of thickness, so the reduced size of the optical system L0 can be maintained.

A description will now be given of a structure that may be satisfied in the optical system L0 according to each example.

The size of the columnar structure may be changed according to a predetermined rule in the radial direction of the lens surface MLS. Thereby, an arbitrary phase change amount can be obtained at a position h in the radial direction. This example uses a filling rate as the size of the columnar structure, but is not limited to this implementation. As the size of the columnar structure, for example, the volume of the columnar structure, the diameter of the columnar structure, and the area occupied by the columnar structure on the lens surface MLS (base area of the columnar structure) may be used.

The subwavelength structure may include a structure in which the columnar structure is provided such that the size of the columnar structure increases or decreases as a position moves away from the center of the lens surface MLS in the radial direction of the lens surface MLS. Such a structure may be periodically provided along the radial direction of the lens surface MLS on at least a part of the lens surface MLS. Thereby, the phase function φ(h) can be continuously changed by repeating the phase change from 0 to 2π or from 0 to −2π in the radial direction of the meta-lens surface MLS, and the meta-lens ML as a whole can serve as a lens.

Figure 23:
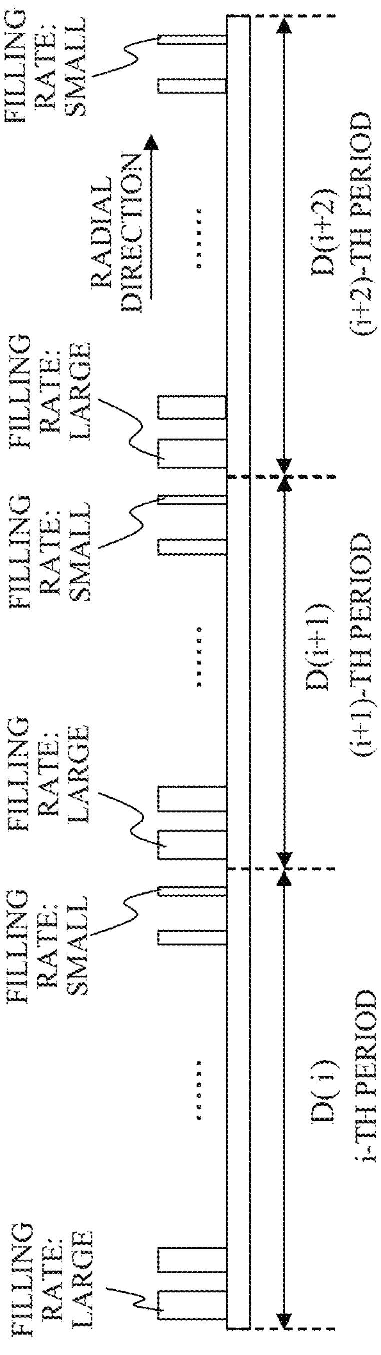
FIG. 23 is a schematic diagram of a meta-lens surface having a phase function including an inflection point.

In a case where a plurality of the above structures are provided along the radial direction of the lens surface MLS in at least a part of the meta-lens surface MLS, a first structure and a second structure included in the plurality of structures may have different distances (intervals, periods) in the radial direction of the lens surface MLS. In at least a part of the meta-lens surface MLS, distances in the radial direction of the plurality of structures may decrease as a position moves away from the center, and then increases as the position moves away from the center. Referring now to FIG. 23, a description will be given of the effect of this change in such a structure.

Figure 24:
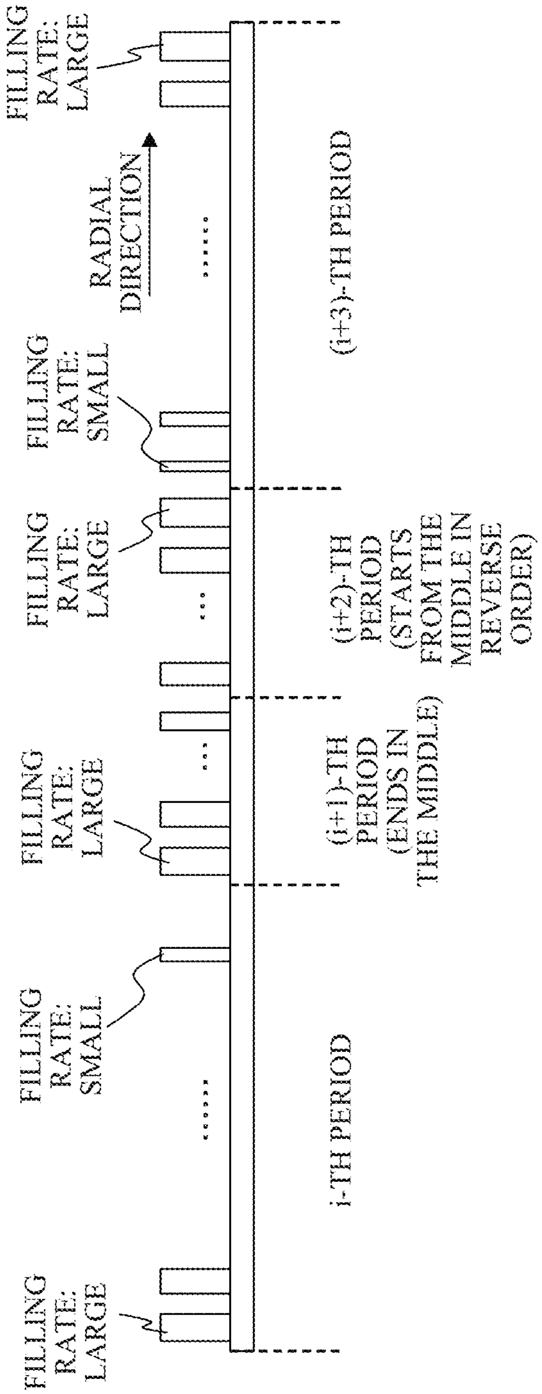
FIG. 24 is a schematic diagram of a meta-lens surface having a phase function including a critical point.

FIG. 23 is a schematic diagram of a meta-lens surface MLS having a phase function φ(h) including an inflection point. In FIG. 23, the lens surface MLS includes a plurality of structures in which the filling rate of the columnar structure decreases as a position moves away from the center of the lens surface MLS in the radial direction of the lens surface MLS. The columnar structure is omitted in the middle, but is provided similarly to FIGS. 19A and 19B. D(i) is a distance in the radial direction of the lens surface MLS of an i-th structure (where i is a natural number) counted from the center of the lens surface among the plurality of structures. In FIG. 24, distance D(i) is longer than distance D(i+1), and distance D(i+1) is shorter than distance D(i+2). That is, in the i-th and (i+1)-th structures, the phase change from 0 to −2π in the (i+1)-th period occurs at a distance narrower than that of the phase change from 0 to −2π in the i-th period. At this time, the slope (absolute value) of the phase function φ(h) is steep along the radial direction of the lens surface MLS. In the (i+1)-th and (i+2)-th structures, the phase change from 0 to −2π in the (i+2)-th period occurs at a distance wider than that of the phase change from 0 to −2π in the (i+1)-th period. At this time, the slope (absolute value) of the phase function φ(h) is gentle along the radial direction of the lens surface MLS. From the above, in FIG. 23, the slope (absolute value) of the phase function φ(h) gradually becomes steeper along the radial direction of the lens surface MLS, and then gradually becomes gentler from the middle. That is, it means that the phase function φ(h) has an inflection point, and an aberration correction effect can be obtained due to the phase function φ(h) including the inflection point.

Although the columnar structures are provided in FIG. 23 so that the filling rate reduces as a position moves away from the center of the lens surface MLS in the radial direction of the lens surface MLS, the columnar structures may be provided so that the filling rate increases.

Figure 3:
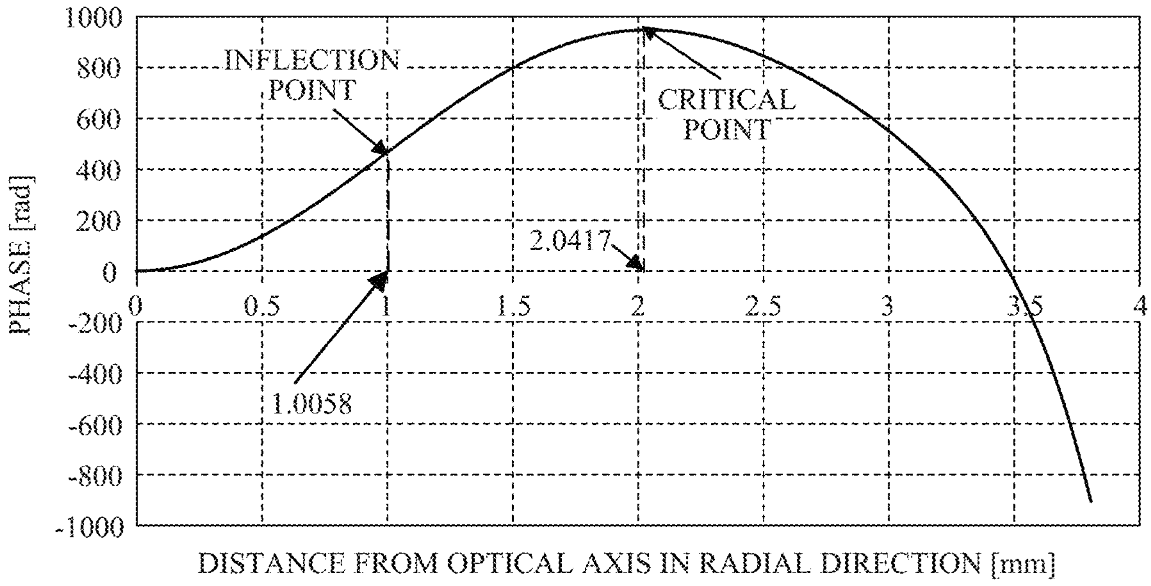
FIG. 3 illustrates a phase function of a meta-lens surface according to Example 1.
Figure 5:
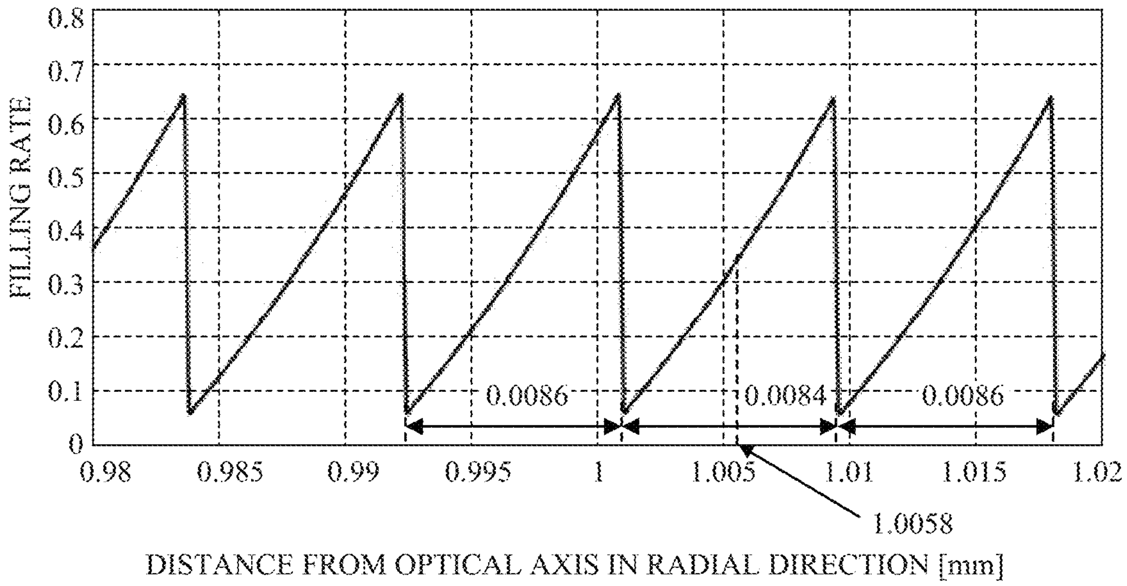
FIG. 5 illustrates changes in the filling rate near an inflection point of the phase function of the meta-lens surface according to Example 1.
Figure 6:
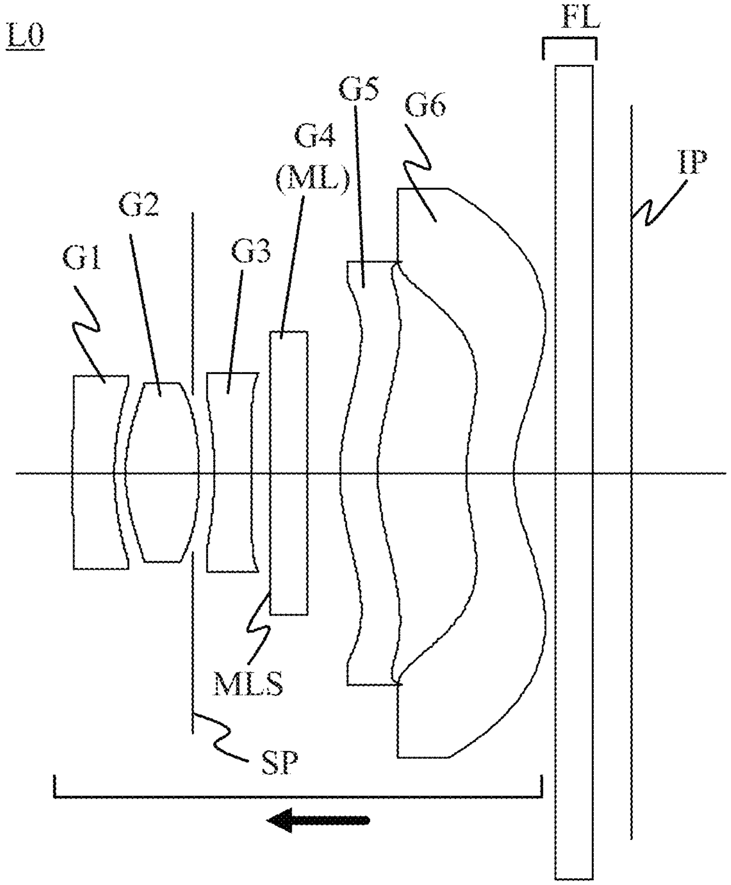
FIG. 6 is a sectional view of an optical system according to Example 2 in an in-focus state at infinity.
Figure 7:
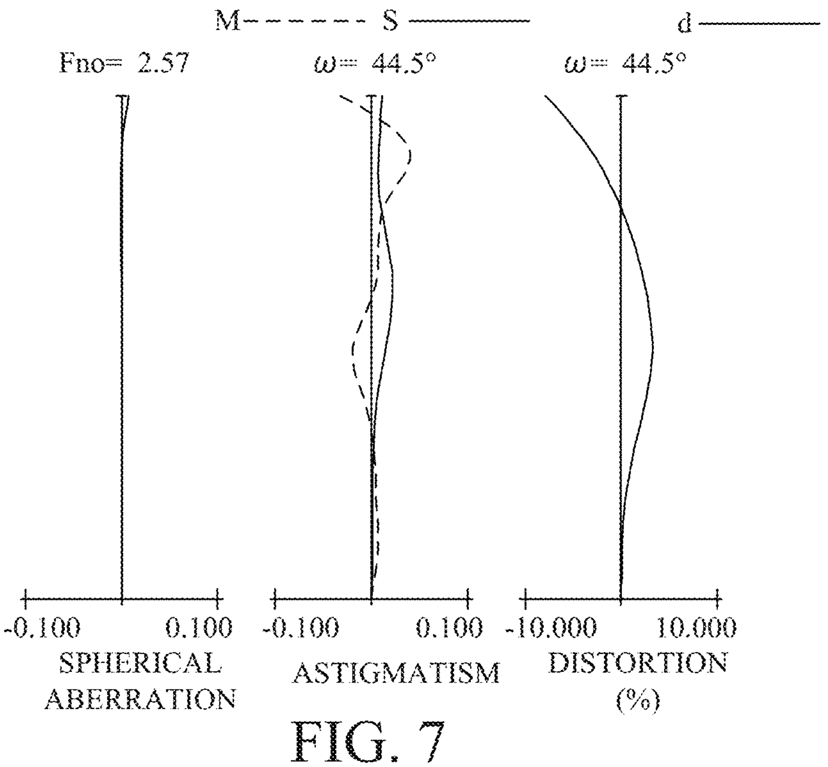
FIG. 7 is a longitudinal aberration diagram of the optical system according to Example 2 in the in-focus state at infinity.

In Example 1, as illustrated in FIGS. 3 and 5, the phase function φ(h) of the meta-lens ML has an inflection point. The filling rate corresponding to the actual columnar structure periodically repeats a change from a small value to a large value, and a distance in the radial direction per period narrows (from 0.0086 mm to 0.0084 mm) before and after the inflection point and then widens (0.0084 mm to 0.0086 mm). That is, the columnar structures are provided so that the phase function φ(h) has an inflection point before and after that point. The inflection point of the phase function φ(h) in Example 1 is 1.0058 mm away from the optical axis in the radial direction.

Figure 8:
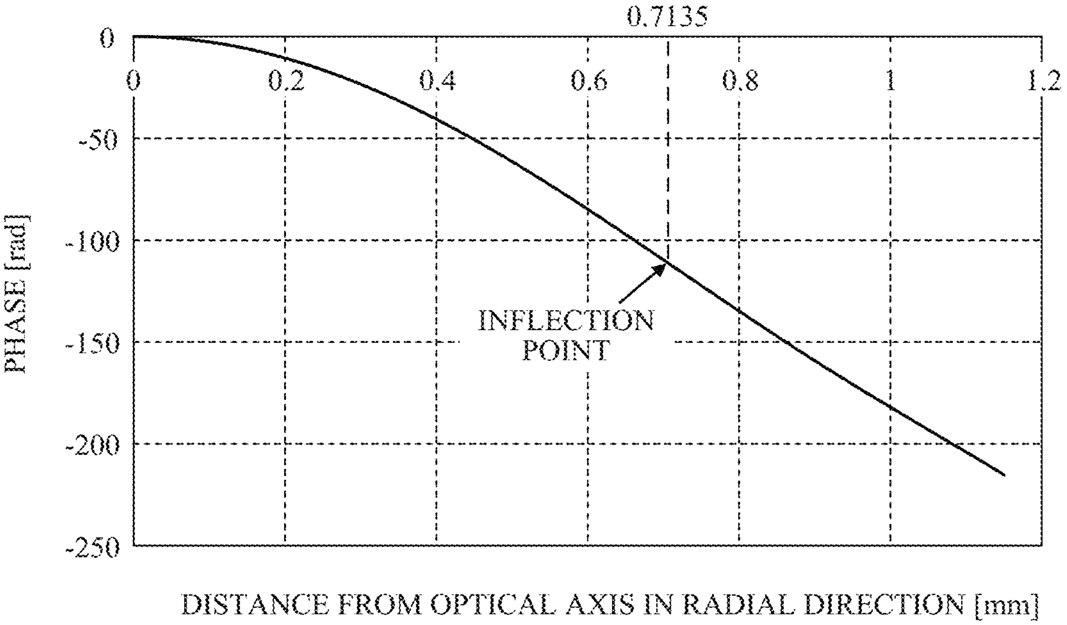
FIG. 8 illustrates a phase function of a meta-lens surface according to Example 2.
Figure 9:
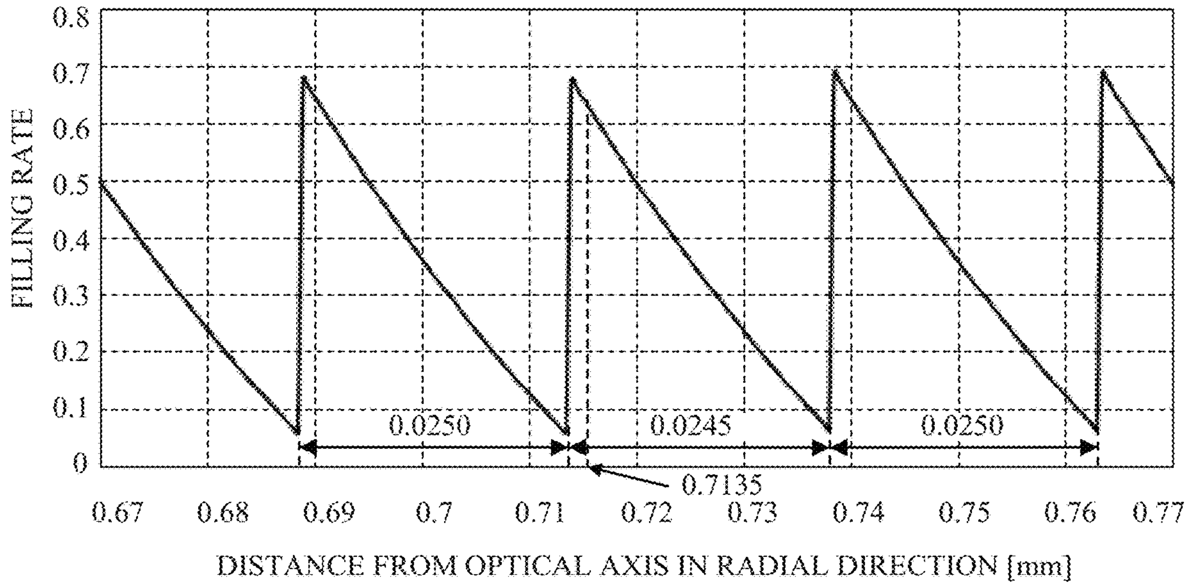
FIG. 9 illustrates changes in a filling rate near an inflection point of the phase function of the meta-lens surface according to Example 2.
Figure 10:
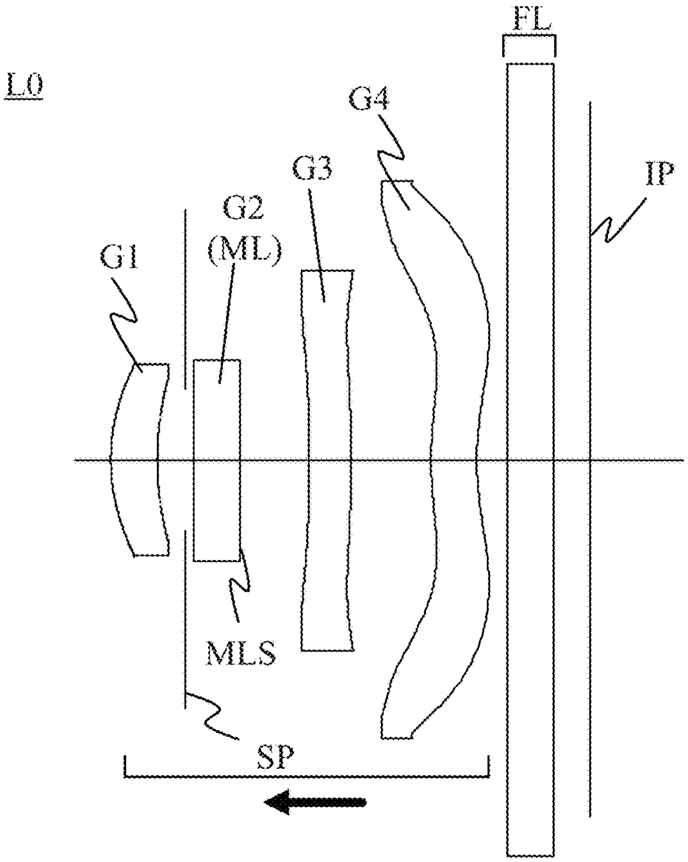
FIG. 10 is a sectional view of an optical system according to Example 3 in an in-focus state at infinity.
Figure 11:
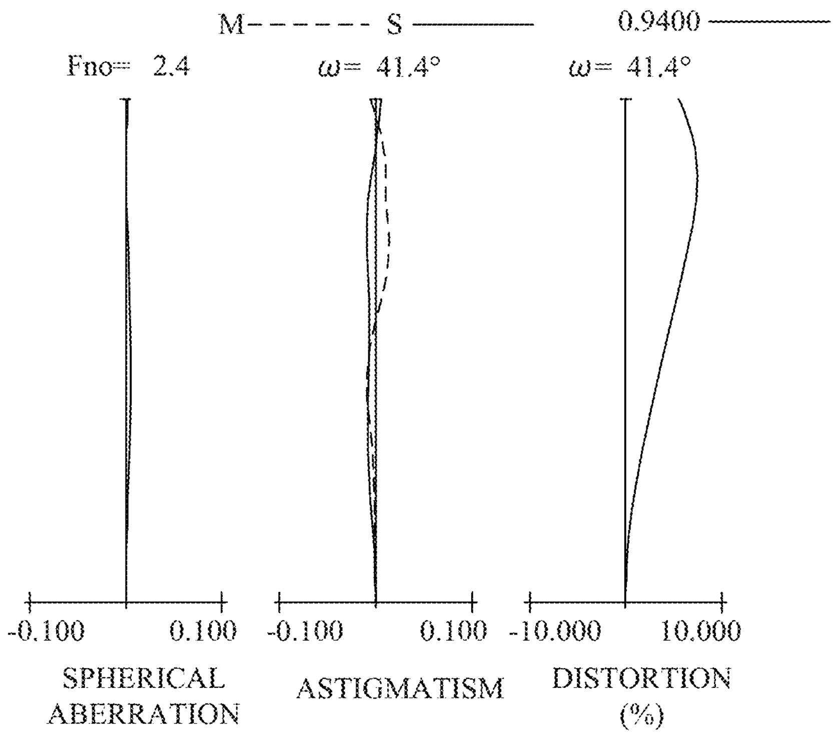
FIG. 11 is a longitudinal aberration diagram of the optical system according to Example 3 in the in-focus state at infinity.

In Example 2, as illustrated in FIGS. 8 and 9, the phase function φ(h) of the meta-lens ML has an inflection point.

The filling rate corresponding to the actual columnar structure periodically repeats a change from a large value to a small value, and a distance in the radial direction per period narrows (from 0.0250 mm to 0.0245 mm) before and after the inflection point and then widens (0.0245 mm to 0.0250 mm). That is, the columnar structures are provided so that the phase function φ(h) has an inflection point before and after that point. The inflection point of the phase function φ(h) in Example 2 is 0.7135 mm away from the optical axis in the radial direction.

Figure 12:
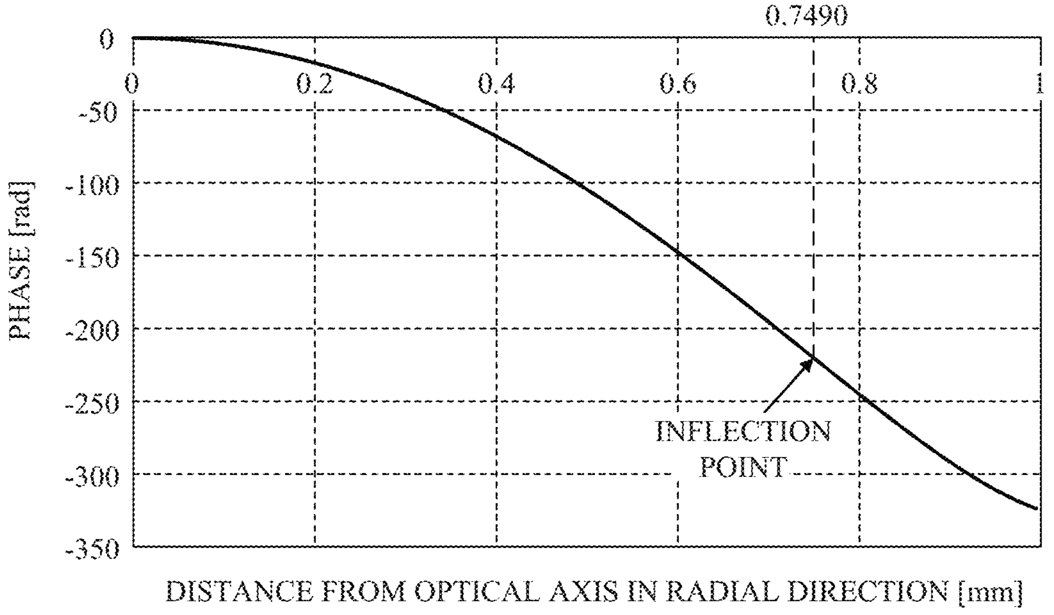
FIG. 12 illustrates a phase function of a meta-lens surface according to Example 3.
Figure 13:
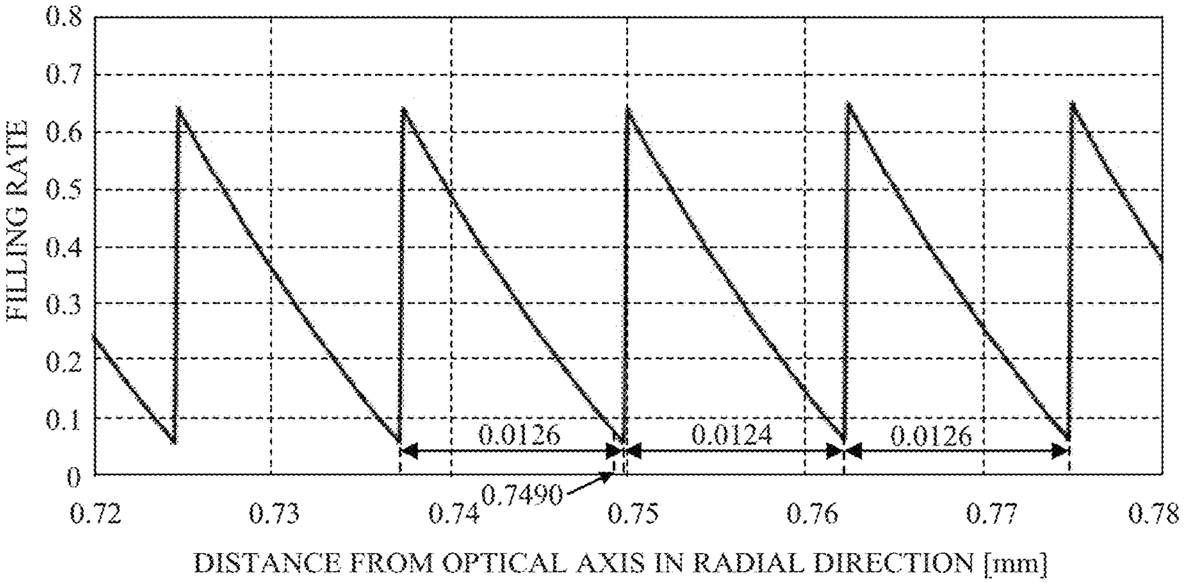
FIG. 13 illustrates changes in a filling rate near an inflection point of the phase function of the meta-lens surface according to Example 3.
Figure 14:
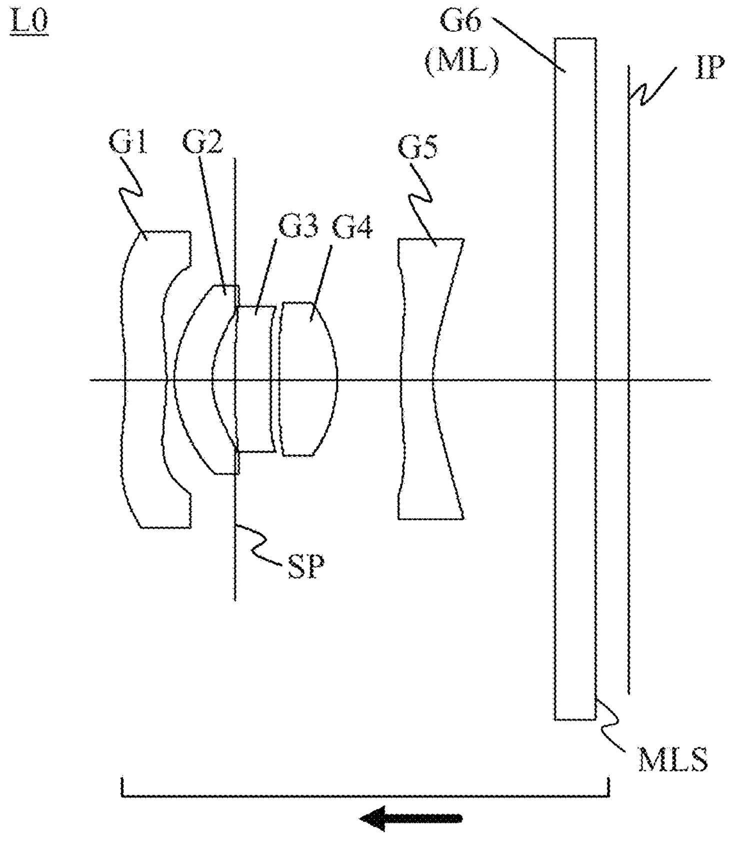
FIG. 14 is a sectional view of an optical system according to Example 4 in an in-focus state at infinity.
Figure 15:
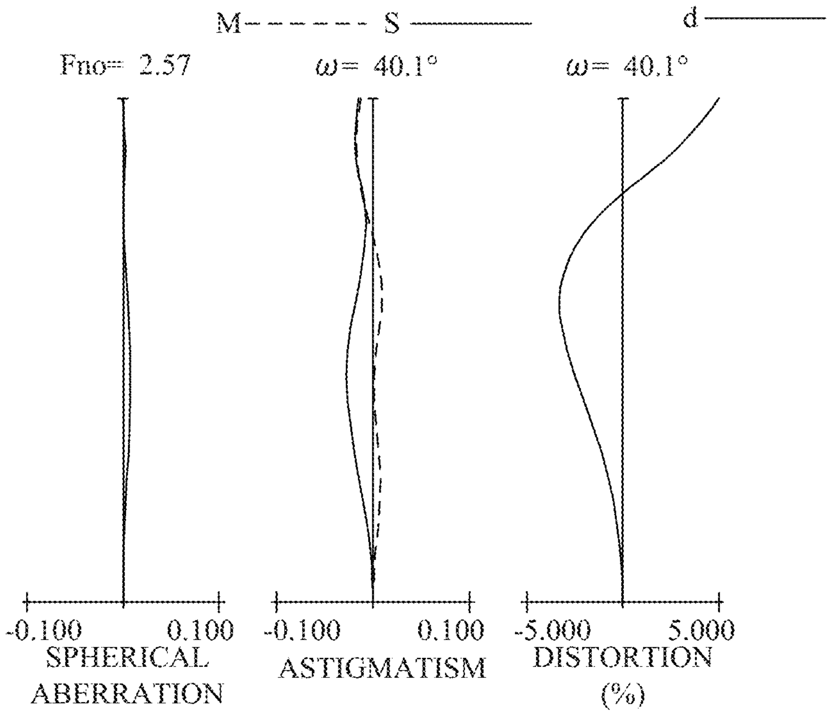
FIG. 15 is a longitudinal aberration diagram of the optical system according to Example 4 in the in-focus state at infinity.

In Example 3, as illustrated in FIGS. 12 and 13, the phase function φ(h) of the meta-lens ML has an inflection point. The filling rate corresponding to the actual columnar structure periodically repeats a change from a large value to a small value, and a distance in the radial direction per period narrows (from 0.0126 mm to 0.0124 mm) before and after the inflection point and then widens (0.0124 mm to 0.0126 mm). That is, the columnar structure is provided so that the phase function φ(h) has an inflection point before and after that point. The inflection point of the phase function φ(h) in Example 3 is 0.7490 mm away from the optical axis in the radial direction.

Figure 16:
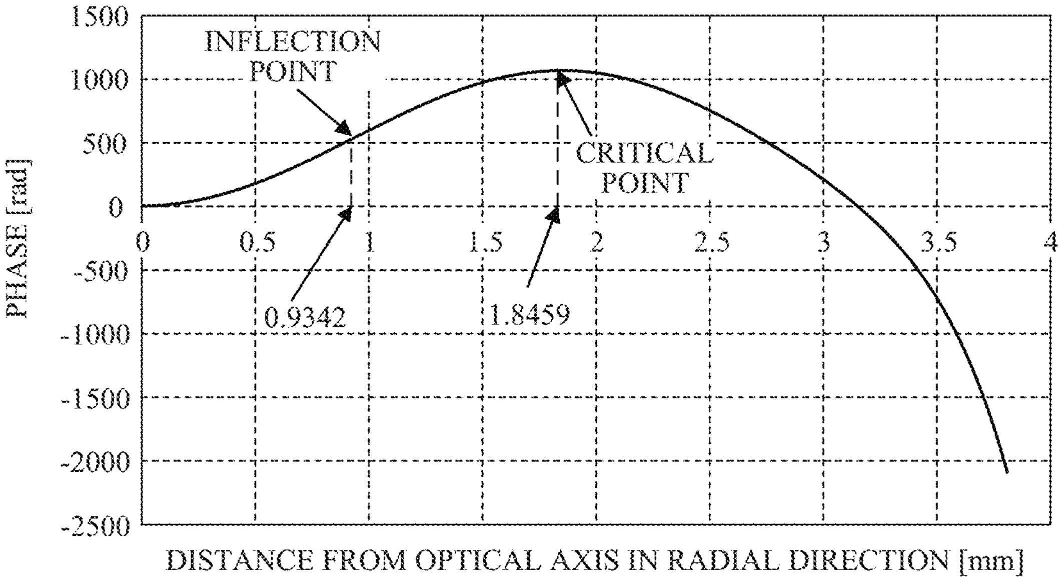
FIG. 16 illustrates a phase function of a meta-lens surface according to Example 4.
Figure 18:
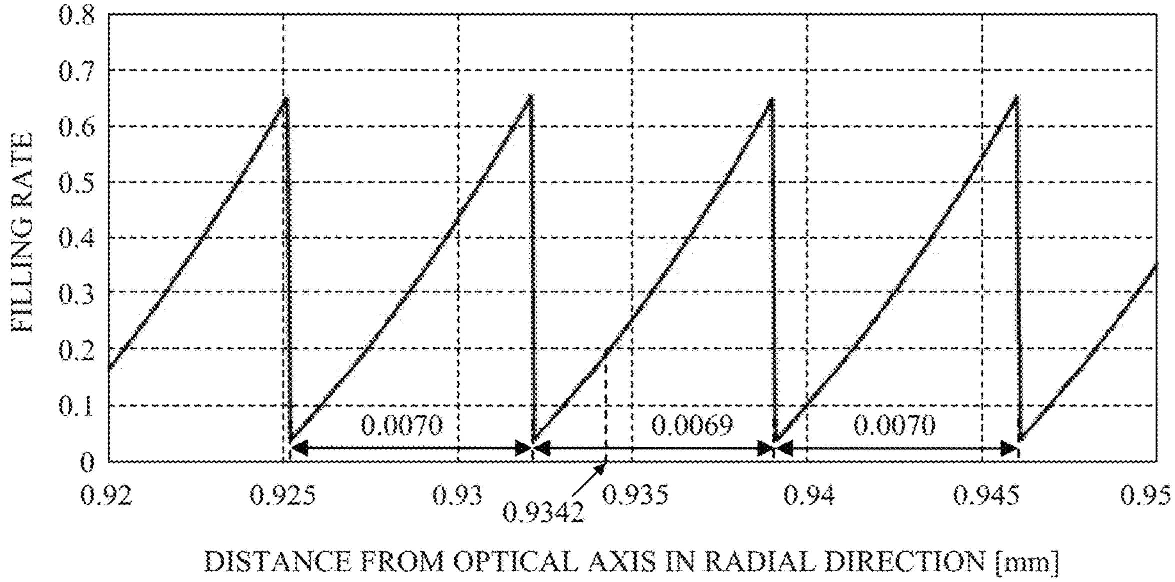
FIG. 18 illustrates changes in a filling rate near an inflection point of the phase function of the meta-lens surface according to Example 4.

In Example 4, as illustrated in FIGS. 16 and 18, the phase function φ(h) of meta-lens ML has an inflection point. The filling rate corresponding to the actual columnar structure periodically repeats a change from a small value to a large value, and a distance in the radial direction per period narrows (from 0.0070 mm to 0.0069 mm) before and after the inflection point and then widens (0.0069 mm to 0.0070 mm). That is, the columnar structures are provided so that the phase function φ(h) has an inflection point before and after that point. The inflection point of the phase function φ(h) in Example 4 is 0.9342 mm away from the optical axis in the radial direction.

In a case where a plurality of the above structures are provided along the radial direction of the lens surface MLS in at least a part of the meta-lens surface MLS, the columnar structures in the first structure and the second structure included in the plurality of structures may have different sizes. For example, in the first structure, the columnar structures are provided so that the size of the columnar structure increases as a position moves away from the center of the lens surface MLS in the radial direction of the lens surface MLS. In the second structure, the columnar structures are provided so that the size of the columnar structure decreases as a position moves away from the center of the lens surface MLS in the radial direction of the lens surface MLS. At least a part of the meta-lens surface MLS has a structure in which the first structure is periodically repeated and a structure in which the second structure is periodically repeated in the radial direction of the lens surface MLS. That is, the structure in which the first structure is periodically repeated and the structure in which the second structure is periodically repeated are switched at a predetermined position in the radial direction of the meta-lens surface MLS. Referring now to FIG. 24, a description will be given of the effect of the above structure.

FIG. 24 is a schematic diagram of a meta-lens surface MLS having a phase function φ(h) including a critical point. In FIG. 24, a structure that causes a phase change from 0 to 2π (or −2π) is repeatedly provided, and the i-th (where i is a natural number), (i+1)-th, (i+2)-th, and (i+3)-th structures are illustrated. The (i+1)-th structure ends before a phase change with a width of 2π occurs, and switches to the (i+2)-th structure. Up to the (i+1)-th structure, the columnar structure is provided so that its size decreases as a position moves away from the center of the lens surface MLS in the radial direction of the lens surface MLS. On the other hand, from the (i+2)-th structure, the columnar structure is provided so that its size increases as a position moves away from the center of the lens surface MLS in the radial direction of the lens surface MLS. Due to this structure, the phase of the phase function φ(h) of the lens surface MLS decreases until the middle of the (i+1)-th period (before switching to the (i+2)-th period), and then increases after switching to the (i+2)-th period. From the above, in FIG. 24, the phase of the phase function φ(h) decreases along the radial direction of the lens surface MLS, and then starts to increase from the middle. That is, it means that the phase function φ(h) has a critical point, and an aberration correction effect can be obtained due to the phase function φ(h) including the critical point.

In FIG. 24, the columnar structure changes so that its filling rate is smaller and then becomes larger as a position moves away from the center of the lens surface MLS in the radial direction of the lens surface MLS, but the example is limited to this implementation. The columnar structure may change so that its filling rate is larger and then becomes smaller as a position moves away from the center of the lens surface MLS in the radial direction of the lens surface MLS. In this case, the phase function φ(h) has a critical point where it turns from an increase to a decrease.

Figure 4:
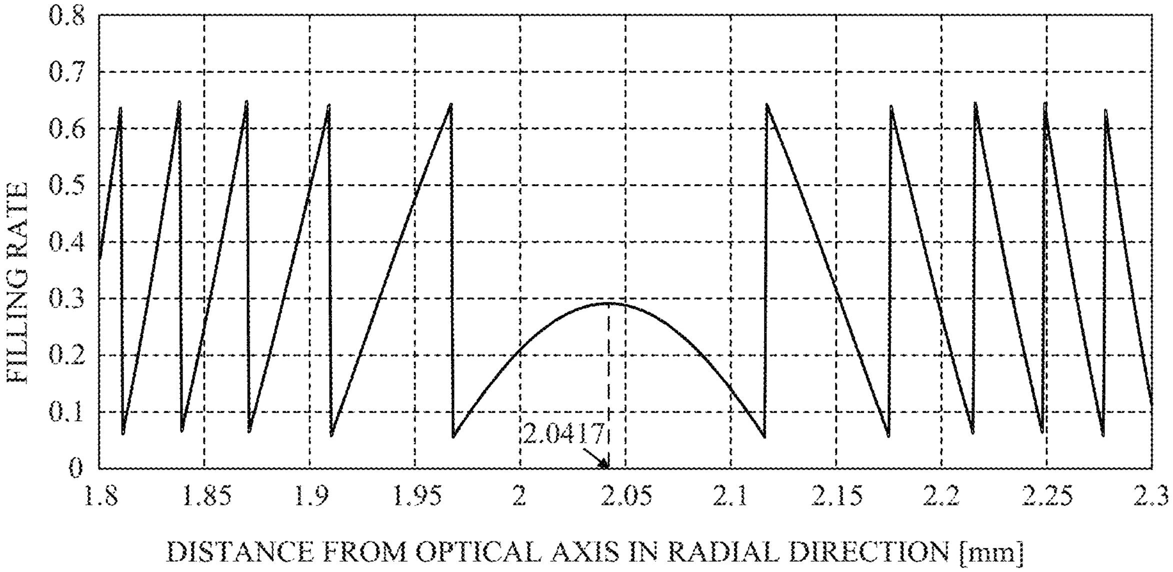
FIG. 4 illustrates a change in a filling rate near a critical point of the phase function of the meta-lens surface according to Example 1.

In Example 1, as illustrated in FIGS. 3 and 4, the phase function φ(h) of the meta-lens ML has a critical point. The filling rate corresponding to an actual columnar structure periodically repeats a change from a small value to a large value, and periodically repeats a change from a large value to a small value in the middle. That is, the columnar structures are provided so that the phase function φ(h) has a critical point before and after that point. The critical point of the phase function φ(h) in Example 1 is 2.0417 mm away from the optical axis in the radial direction.

Figure 17:
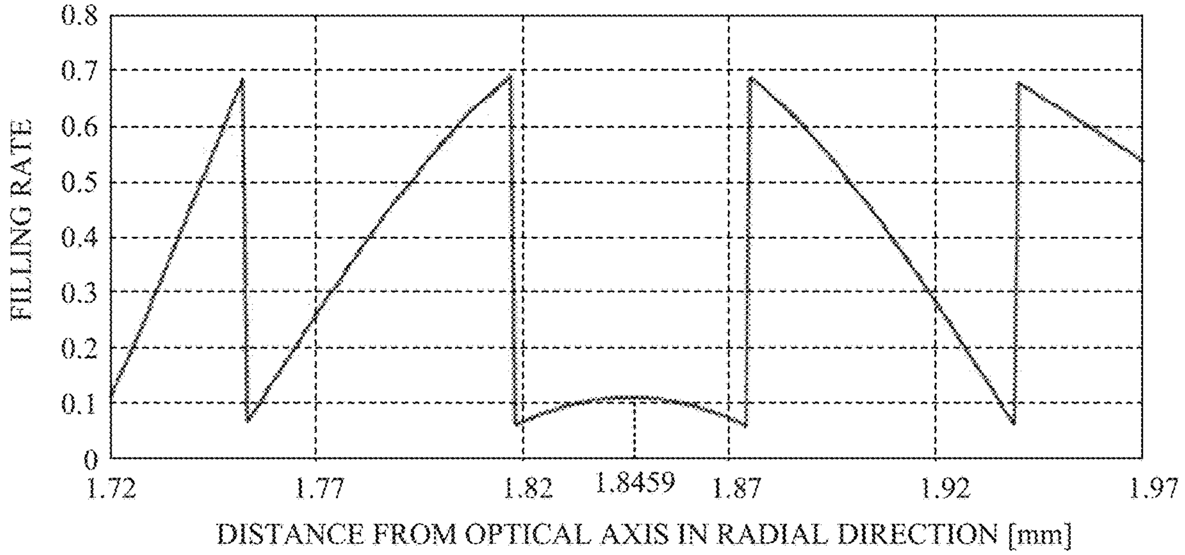
FIG. 17 illustrates changes in a filling rate near a critical point of the phase function of the meta-lens surface according to Example 4.

In Example 4, as illustrated in FIGS. 16 and 17, the phase function φ(h) of meta-lens ML has a critical point. The filling rate corresponding to an actual columnar structure periodically repeats a change from a small value to a large value, and periodically repeats a change from a large value to a small value in the middle. That is, the columnar structures are provided so that the phase function φ(h) has a critical point before and after that point. The critical point of the phase function φ(h) in Example 4 is 1.8459 mm away from the optical axis in the radial direction.

The characteristic structure of the meta-lens ML and its aberration correction effect have been described above, but if the optical system L0 consists of the meta-lens ML, the aberration correcting effect is limited. Accordingly, aberrations may be corrected by combining the meta-lens ML with an aspheric lens. Using the meta-lens ML in combination with the aspherical lens can provide a synergistic effect on aberration correction. Accordingly, the optical system L0 according to each example includes at least one aspherical lens. At least one of a lens surface on the object side of the aspherical lens and a lens surface on the image side of the aspherical lens is aspheric, and the aspherical surface has at least one of an inflection point and a critical point.

In Examples 1 and 4, spherical aberration and coma are corrected using an aspherical lens having large refractive power placed near the aperture stop SP, but the curvature of field tends to waver as a result. Accordingly, disposing the meta-lens ML whose phase function φ(h) has a critical point or an inflection point near the image plane can selectively correct the curvature of field.

In Examples 2 and 3, spherical aberration and coma are canceled out by an aspherical lens having negative refractive power and a meta-lens ML having positive refractive power. A sufficient aberration correction effect can be obtained by using many meta-lens MLs, but in that case, the reduction in efficiency due to unnecessary diffracted light derived from the subwavelength structure and the influence on the image quality due to flare cannot be ignored. Therefore, the meta-lens ML may be used in combination with the aspheric lens.

The shape of the columnar structure may be a cylindrical column having two substantially similar and substantially parallel planar figures on a top surface and a bottom surface. If the shape of the columnar structure is similar to a cone or pyramid, for example, manufacturing using a semiconductor manufacturing process such as lithography becomes difficult.

A description will now be given of inequalities that may be satisfied by the optical system L0 according to each example. The optical system L0 according to each example may satisfy one or more of the following inequalities (1) to (12):

$$0.050 < r/D < 0.425 \quad (1)$$

$$0.1 < |fM|/f < 10.0 \quad (2)$$

$$0.1 < fP/f < 10.0 \quad (3)$$

$$-10.0 < fN/f < -0.1 \quad (4)$$

$$1.0 < H/\lambda < 3.0 \quad (5)$$

$$0.3 < r\max/\lambda < 0.9 \quad (6)$$

$$0.05 < r\min/\lambda < 0.5 \quad (7)$$

Here, r represents a distance from the center of the lens surface MLS in the radial direction of the meta-lens surface MLS to a position on the lens surface MLS corresponding to at least one of the critical point and inflection point of the phase function φ(h) of the meta-lens surface MLS. D is an effective diameter of the meta-lens surface MLS (a distance twice as large as a distance from the optical axis to a ray furthest from the optical axis in the radial direction among rays passing through the meta-lens surface MLS). f represents a focal length of the optical system L0. fM represents a focal length of the meta-lens ML. fP represents a focal length of at least one lens having positive refractive power (positive lens) included in the optical system L0. fN represents a focal length of at least one lens having negative refractive power (negative lens) included in the optical system L0. H represents a maximum height (length in a direction parallel to the optical axis direction) of the columnar structure. λ represents a designed wavelength, which is, for example, a wavelength that maximizes the transmittance of light (substantially parallel light) incident on the meta-lens ML along the optical axis, that is, a ratio of the intensity of the output light to the intensity of the incident light. rmax and rmin represent a maximum diameter and a minimum diameter, respectively, of the diameters of the columnar structures provided on the meta-lens surface MLS. A diameter of a columnar structure is a diameter of a circle circumscribing the shape of the bottom surface in a case where the bottom surface of the columnar structure is a substantially circle or a substantially regular polygon, and in a case where the bottom surface of the columnar structure is any other shape, it is a maximum length of a length of a line segment obtained by connecting two arbitrary points on the bottom surface.

Inequality (1) defines a value of a ratio of the distance from the center of the lens surface MLS to the critical point or inflection point of the phase function φ(h) of the meta-lens surface MLS in the radial direction of the meta-lens surface MLS to the effective diameter of the meta-lens surface MLS. As described above, the meta-lens ML has an effect of significantly changing the refractive power between the vicinity of the optical axis and the periphery of the optical axis on the meta-lens surface MLS, and an effect of changing the sign of the refractive power. Therefore, the meta-lens ML disposed near the image plane away from the aperture stop SP can satisfactorily correct curvature of field and astigmatism from the center of the image (image plane) to the periphery of the image, using a difference in refractive power between the center and the periphery. In addition, the meta-lens ML disposed near the aperture stop SP can satisfactorily correct spherical aberration and coma. Moreover, the meta-lens ML disposed on the object side of the aperture stop SP can satisfactorily correct distortion. In a case where the distance from the center of the lens surface MLS to the critical point or inflection point of the phase function φ(h) of the meta-lens surface MLS becomes smaller and the value of r/D becomes lower than the lower limit of inequality (1), a change in the refraction within the meta-lens surface MLS becomes too steep and the aberration correction effect becomes excessive. In a case where the distance from the center of the lens surface MLS to the critical point or inflection point of the phase function φ(h) of the meta-lens surface MLS becomes larger and the value of r/D becomes higher than the upper limit of inequality (1), the position corresponding to the critical point or the inflection point of the meta-lens surface MLS becomes too close to the periphery. In this case, the aberration correction effect using the difference in refractive power between the center and the periphery becomes limited.

Inequality (2) defines a value of a ratio of the focal length of the meta-lens ML to the focal length of the optical system L0. Generally, in order to correct or suppress aberrations, the refractive power of the optical system L0 may be shared by a plurality of lenses. Therefore, in order to correct aberrations using the meta-lens ML, the meta-lens ML may share a certain amount of the refractive power of the optical system L0. Thereby, the refractive powers of lenses other than the meta-lens ML can be reduced, and the aberration correction effect can be properly obtained while aberrations are suppressed. In a case where the absolute value of the focal length of the meta-lens ML becomes smaller and the value of |fM|/f becomes lower than the lower limit of inequality (2), the refractive power of the meta-lens ML becomes too large and aberration correction becomes excessive. In a case where the absolute value of the focal length of the meta-lens ML becomes larger and the value of |fM|/f becomes higher than the upper limit of inequality (2), the effect of sharing the refractive power becomes smaller and the refractive powers of the other lenses become relatively larger. At this time, the generated aberration becomes large and the aberration correction effect of the meta-lens ML becomes small.

Inequality (3) defines a value of a ratio of the focal length of at least one lens having positive refractive power included in the optical system L0 to the focal length of the optical system L0. A combination of the lens having positive refractive power and the meta-lens ML can satisfactorily correct aberrations by sharing the refractive power, suppressing aberrations, and canceling out aberrations. In a case where the focal length of the lens having positive refractive power becomes shorter and the value of fP/f becomes lower than the lower limit of inequality (3), the refractive power of the lens having positive refractive power becomes too large, and spherical aberration and curvature of field significantly occur in the undercorrection direction. In a case where the focal length of the lens having positive refractive power becomes longer and the value of fP/f becomes higher than the upper limit of inequality (3), the refractive-power sharing effect and the aberration correcting effect of the lens having positive refractive power reduce.

Inequality (4) defines a value of a ratio of the focal length of at least one lens having negative refractive power included in the optical system L0 to the focal length of the optical system L0. A combination of the lens having negative refractive power and the meta-lens ML can satisfactorily correct aberrations by sharing the refractive power, suppressing aberrations, and canceling out aberrations. In a case where the focal length of the lens having negative refractive power becomes shorter and the value of fN/f becomes than the lower limit of inequality (4), the refractive power of the lens having negative refractive power becomes too large, and spherical aberration and curvature of field significantly occur in the overcorrection direction. In a case where the focal length of the lens having negative refractive power becomes longer and the value of fN/f becomes higher than the upper limit of inequality (4), the refractive-power sharing effect and the aberration correction effect of the lens having negative refractive power reduce.

Inequality (5) defines a value of a ratio of the maximum height of the columnar structure to the designed wavelength. Satisfying inequality (5) can provide an optical path length corresponding to the designed wavelength or longer on the meta-lens surface MLS, and enables the meta-lens ML to achieve a continuous desired phase change through a periodic structure repetition that generates a phase change from 0 to 2π as described above. In a case where the maximum height of the columnar structure decreases and the value of H/λ becomes lower than the lower limit of inequality (5), a phase change from 0 to 2π (width: 2π) cannot be generated, and the phase becomes discontinuous at the boundary of periodical repetition and the wavefronts of the designed wavelength are not continuously connected. In a case where the maximum height of the columnar structure becomes higher and the value of H/λ becomes higher than the upper limit of inequality (5), the maximum height of the columnar structure becomes too high and manufacturing becomes difficult.

Inequality (6) defines a value of a ratio of the maximum diameter among the diameters of the columnar structure provided on the meta-lens surface MLS to the designed wavelength. Satisfying inequality (6) enables the meta-lens ML to behave as an average effective medium for light. In a case where the maximum diameter decreases and the value of rmax/λ becomes lower than the lower limit of inequality (6), the filling rate necessary to generate a phase change from 0 to 2π (width: 2π) cannot be obtained, and the wavefronts of the designed wavelength are not continuously connected. In a case where the maximum diameter increases and the value of rmax/λ becomes higher than the upper limit of inequality (6), the columnar structure becomes too large for light having the designed wavelength, unintended diffracted light, flare, or reflected light may occur.

Inequality (7) defines a value of a ratio of the minimum diameter among the diameters of the columnar structure provided on the meta-lens surface MLS to the designed wavelength. Satisfying inequality (7) enables the meta-lens ML to behave as an average effective medium for light. In a case where the minimum diameter decreases and the value of rmin/A becomes lower than the lower limit of inequality (7), the columnar structure becomes too thin and manufacturing becomes difficult. In a case where the minimum diameter increases and the value of rmin/Λ becomes higher than the upper limit of inequality (7), the filling rate necessary to generate a phase change from 0 to 2π (width: 2π) cannot be obtained, and the wavefronts of the designed wavelength are not continuously connected.

Inequalities (1) to (7) may be replaced with the following inequalities (la) to (7a):

$$0.085 < r/D < 0.415 \quad (1a)$$

$$0.3 < |fM|/f < 9.0 \quad (2a)$$

$$0.15 < fP/f < 9.70 \quad (3a)$$

$$-9.5 < fN/f < -0.4 \quad (4a)$$

$$1.1 < H/\lambda < 2.5 \quad (5a)$$

$$0.35 < r\max/\lambda < 0.87 \quad (6a)$$

$$0.07 < r\min/\lambda < 0.45 \quad (7a)$$

Inequalities (1) to (7) may be replaced with the following inequalities (1b) to (7b):

$$0.095 < r/D < 0.405 \quad (1b)$$

$$0.6 < |fM|/f < 8.0 \quad (2b)$$

$$0.30 < fP/f < 9.50 \quad (3b)$$

$$-9.0 < fN/f < -0.7 \quad (4b)$$

$$1.15 < H/\lambda < 2.20 \quad (5b)$$

$$0.40 < r\max/\lambda < 0.85 \quad (6b)$$

$$0.09 < r\min/\lambda < 0.40 \quad (7b)$$

Inequalities (1) to (7) may be replaced with the following inequalities (1c) to (7c):

$$0.110 < 2\times r/D < 0.395 \quad (1c)$$

$$0.8 < |fM|/f < 7.0 \quad (2c)$$

$$0.40 < fP/f < 9.20 \quad (3c)$$

$$-8.0 < fN/f < -1.0 \quad (4c)$$

$$1.2 < H/\lambda < 2.0 \quad (5c)$$

$$0.45 < r\max/\lambda < 0.83 \quad (6c)$$

$$0.14 < r\min/\lambda < 0.35 \quad (7c)$$

A detailed description will be given of the optical system L0 according to each example.

Figure 25:
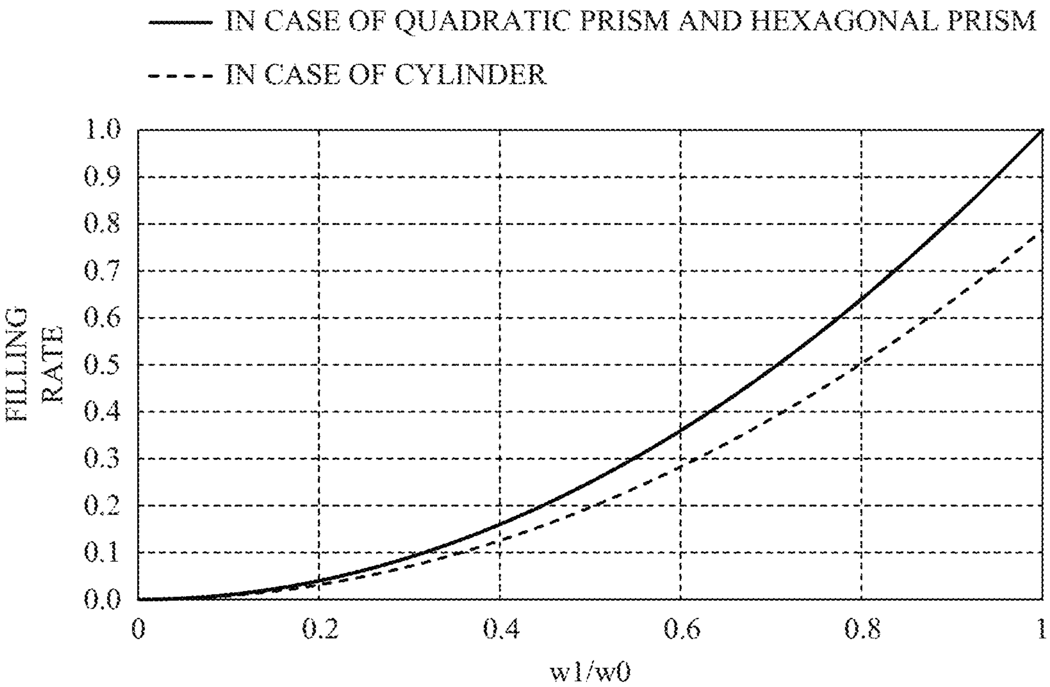
FIG. 25 illustrates a relationship between a value of a ratio of a length of the columnar structure to a size of a substrate, and a filling rate (filling factor).
Figure 26A:
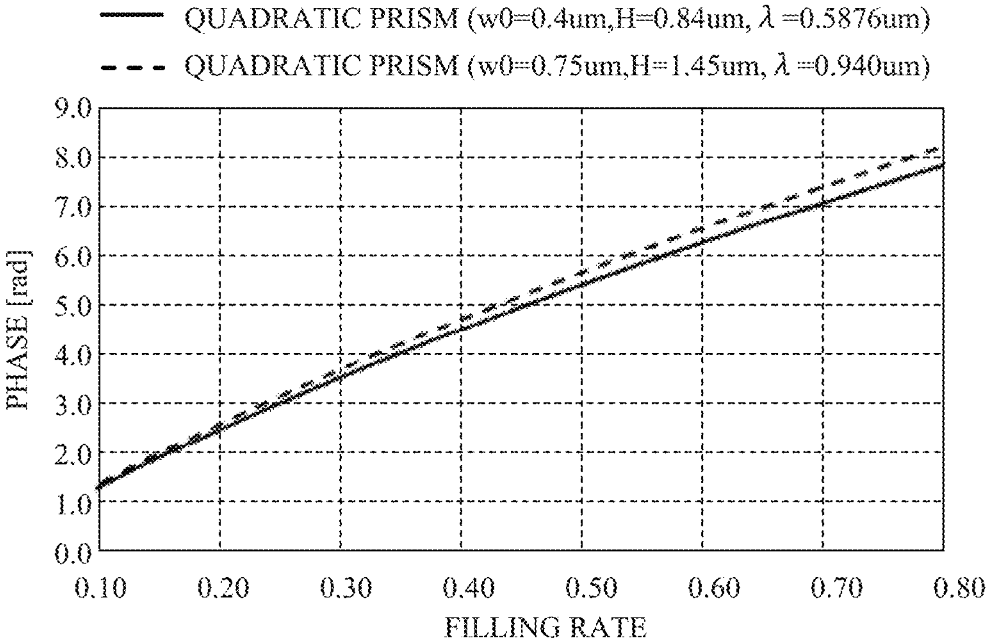
FIGS. 26A, 26B, and 26C illustrate a relationship between a filling rate and a phase change amount.
Figure 26B:
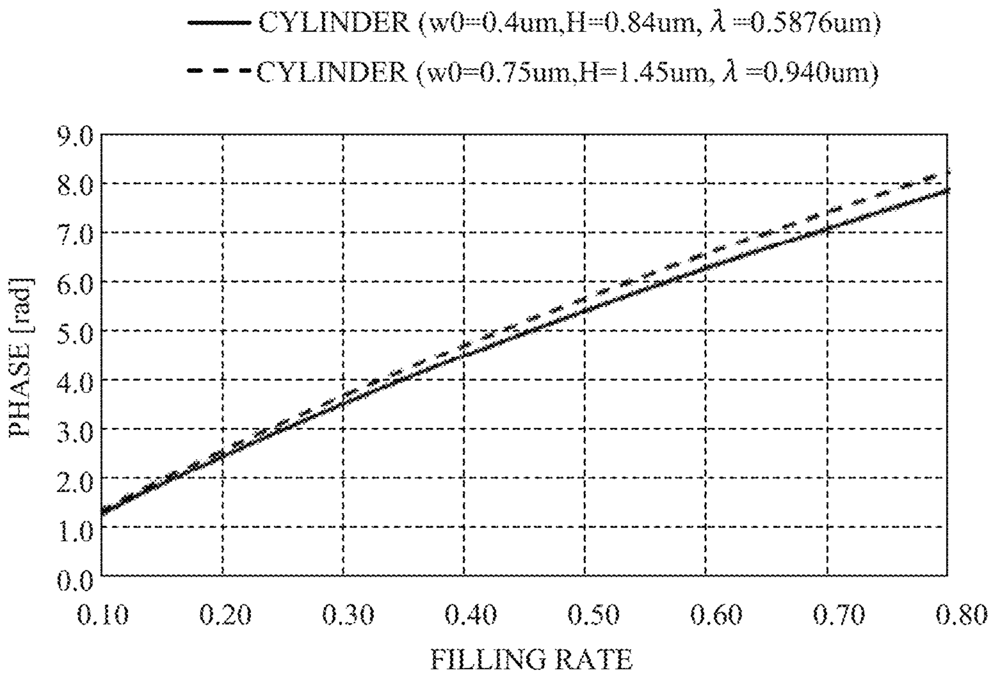
Figure 26C:
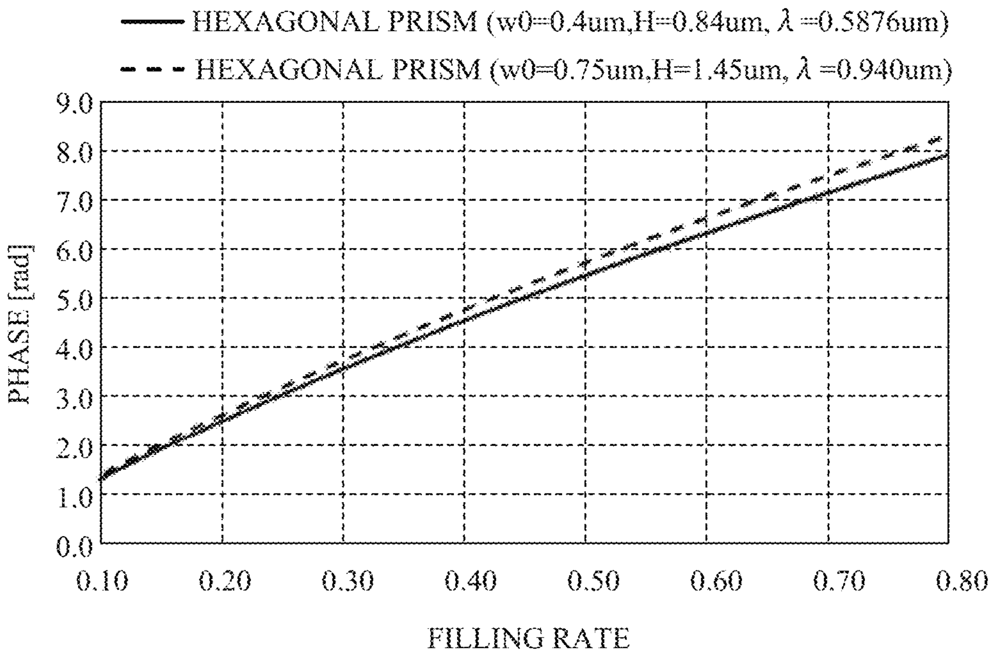

In Example 1, the optical system L0 includes, in order from the object side to the image side, a first lens G1 to a sixth lens G6 having positive, negative, positive, positive, negative, and negative refractive powers. In Example 1, the designed wavelength is 940 nm. The meta-lens ML in Example 1 is the sixth lens G6, and the meta-lens surface MLS is a lens surface on the image side of the sixth lens G6. The meta-lens ML has negative refractive power near the optical axis. The refractive index of the columnar structure of the meta-lens surface MLS is 2.0164 for the designed wavelength. The cylindrical columnar structure (cylinder) illustrated in FIGS. 21A and 21B is provided on the meta-lens surface MLS according to FIGS. 25 (broken line) and 26B (broken line) so as to generate the phase change illustrated in FIG. 3 while the diameter w1 of the circle is changed. In Example 1, the length w0 of the substrate is 0.75 μm, the height H of the columnar structure is 1.45 μm, and the diameter w1 varies in the range of 0.200 μm to 0.685 μm.

In Example 2, the optical system L0 includes, in order from the object side to the image side, a first lens G1 to a sixth lens G6 having negative, positive, negative, positive, positive, and negative refractive powers. In Example 2, the designed wavelength is 587.56 nm. The meta-lens ML in Example 2 is the fourth lens G4, and meta-lens surface MLS is a lens surface on the object side of the fourth lens G4. The meta-lens ML has positive refractive power near the optical axis. The refractive index of the columnar structure of the meta-lens surface MLS is 2.0458 for the designed wavelength. The rectangular columnar structure (quadrangular or quadratic prism) illustrated in FIGS. 20A and 20B is provided on the meta-lens surface MLS according to FIGS. 25 (solid line) and 26A (solid line) so as to generate the phase change illustrated in FIG. 8 while the length w1 of the side of the rectangle is changed. In Example 2, the length w0 of the substrate is 0.40 μm, the height H of the columnar structure is 0.84 μm, and the side length w1 varies in the range of 0.100 μm to 0.335 μm.

In Example 3, the optical system L0 includes, in order from the object side to the image side, a first lens G1 to a fourth lens G4 having positive, positive, negative, and negative refractive powers. In Example 3, the designed wavelength is 940 nm. The meta-lens ML in Example 3 is the second lens G2, and the meta-lens surface MLS is a lens surface on the image side of the second lens G2. The meta-lens ML has positive refractive power near the optical axis. The refractive index of the columnar structure of the meta-lens surface MLS is 2.0164 for the designed wavelength. The hexagonal columnar structure (hexagonal prism) illustrated in FIGS. 22A and 22B is provided on the meta-lens surface MLS according to FIGS. 25 (solid line) and 26C (broken line) so as to generate the phase change illustrated in FIG. 12 while the length w1 of one side of the hexagon is changed. In Example 3, the length w0 of the substrate is 0.75 μm, the height H of the columnar structure is 1.45 μm, and the side length w1 varies in the range of 0.180 μm to 0.607 μm.

In Example 4, the optical system L0 includes, in order from the object side to the image side, a first lens G1 to a sixth lens G6 having positive, negative, positive, positive, negative, and negative refractive powers. In Example 4, the designed wavelength is 587.56 nm. The meta-lens ML in Example 4 is the sixth lens G6, and the meta-lens surface MLS is a lens surface on the image side of the sixth lens G6. The meta-lens ML has negative refractive power near the optical axis. The refractive index of the columnar structure of the meta-lens surface MLS is 2.0458 for the designed wavelength. The cylindrical columnar structure (cylinder) illustrated in FIGS. 21A and 21B is provided on the meta-lens surface MLS according to FIGS. 25 (broken line) and 26B (solid line) so as to generate the phase changes illustrated in FIG. 16 while changing the diameter w1 of the circle. In Example 4, the length w0 of the substrate is 0.40 μm, the height H of the columnar structure is 0.84 μm, and the diameter w1 varies from 0.180 μm to 0.367 μm.

Numerical examples 1 to 4 corresponding to Examples 1 to 4 will be illustrated below.

In surface data of each numerical example, r represents a radius of curvature of each optical surface, and d (mm) represents an on-axis distance (distance on the optical axis) between m-th and (m+1)th surfaces, where m is a surface number counted from the light incident side. nd represents a refractive index of each optical member for the d-line, and vd represents the Abbe number of the optical member. n940 is a refractive index of each optical member for a wavelength of 940 nm. The Abbe number of a certain material is represented as follows:

$$vd=(Nd-1)/(NF-NC)$$

where Nd, NF, and NC are refractive indexes of the d-line (587.6 nm), F-line (486.1 nm), and C-line (656.3 nm) in the Fraunhofer line.

In each numerical example, d, a focal length (mm), an F-number, and a half angle of view (°) are all values in a case where the optical system L0 is in an in-focus state on an infinity object. A back focus BF is a distance on the optical axis from the final lens surface (lens surface closest to the image plane) of the optical system L0 to the (paraxial) image plane expressed in terms of air equivalent length. An overall lens length is a length obtained by adding the back focus to the distance on the optical axis from the foremost lens surface (lens surface closest to the object) to the final lens surface (that does not include the optical block FL).

An asterisk "*" attached to the right side of a surface number means that the optical surface is aspheric. The aspherical shape is expressed as follows:

$$X=(h^2/R)/\left[1+\{1-(1+K)(h/R)^2\}^{1/2}\right]+A4\times h^4+A6\times h^6+A8\times h^8+A10\times h^{10}+A12\times h^{12}$$

where X is a displacement amount from the surface vertex in the optical axis direction, h is a height from the optical axis in the direction perpendicular to the optical axis, R is a paraxial radius of curvature, K is a conical constant, and A4, A6, A8, A10, and A12 are aspherical coefficients of each order. "e±XX" in each aspherical coefficient means "$\times10^{\pm XX}$."

MLS indicates that the surface is a meta-lens surface. Where B2, B4, B6, B8, B10, and B12 are coefficients of each order, the phase function o of the meta-lens surface is expressed as a power series polynomial:

$$\varphi=B2\times h^2+B4\times h^4+B6\times h^6+B8\times h^8+B10\times h^{10}+B12\times h^{12}+B14\times h^{14}$$

Where Φ is an optical path difference function of the meta-lens surface, A is a designed wavelength, and C2, C4, C6, C8, C10, and C12 are the coefficients of each order, the optical path difference function @ is expressed as a power series polynomial:

$$\Phi=\varphi\times\lambda/(2\pi)=$$

-continued $$C2\times h^2+C4\times h^4+C6\times h^6+C8\times h^8+C10\times h^{10}+C12\times h^{12}+C14\times h^{14}$$

At this time, where fM is a focal length of the meta-lens surface, the following equation is established:

$$1/fM=-2\times C2=-2\times\lambda\times B2/(2\pi)$$

"e±XX" in each coefficient means "$\times10^{\pm XX}$."

Numerical Example 1

UNIT: mm

SURFACE DATA

| Surface No. | r | d | n940 | νd | Effective Diameter |
|---|---|---|---|---|---|
| 1* | −3.433 | 0.50 | 1.52639 | 55.7 | 3.38 |
| 2* | −2.603 | 0.10 | | | 2.53 |
| 3* | 1.322 | 0.40 | 1.63455 | 20.4 | 2.04 |
| 4* | 0.961 | 0.29 | | | 1.61 |
| 5 (SP) | ∞ | 0.00 | | | 1.61 |
| 6* | 6.494 | 0.42 | 1.52639 | 55.7 | 1.54 |
| 7* | −27.169 | 0.11 | | | 1.53 |
| 8* | −19.890 | 0.65 | 1.52639 | 55.7 | 1.56 |
| 9* | −1.623 | 0.74 | | | 1.61 |
| 10* | 3.480 | 0.40 | 1.64307 | 19.3 | 2.62 |
| 11* | 1.970 | 1.40 | | | 3.18 |
| 12 | ∞ | 0.50 | 1.50792 | 64.1 | 6.91 |
| 13 (MLS) | ∞ | 0.40 | | | 7.61 |
| Image Plane | ∞ | | | | |

ASPHERIC DATA

1st Surface
K = 0.00000e+00 A 4 = 8.31829e−02 A 6 = −6.80816e−03
A 8 = 4.96011e−05
2nd Surface
K = −7.83575e+00 A 4 = 1.39114e−01 A 6 = −2.53752e−02
A 8 = 1.68533e−02
3rd Surface
K = −4.53662e+00 A 4 = 1.33684e−01 A 6 = −4.83426e−02
A 8 = 1.34721e−02
4th Surface
K = −3.57529e+00 A 4 = 1.07508e−01 A 6 = −2.00095e−02
A 8 = −4.70803e−02
6th Surface
K = 1.00000e+01 A 4 = 9.41213e−03 A 6 = 6.12387e−02
A 8 = −1.55783e−01 A10 = −2.77809e−03
7th Surface
K = −1.86654e+01 A 4 = 1.49386e−01 A 6 = 1.09103e−01
A 8 = −8.78459e−02 A10 = 8.49814e−03
8th Surface
K = 0.00000e+00 A 4 = 7.25912e−02 A 6 = 5.61224e−02
A 8 = −2.60104e−02
9th Surface
K = 0.00000e+00 A 4 = −3.42408e−02 A 6 = 1.36192e−02
A 8 = −2.08664e−02
10th Surface
K = 0.00000e+00 A 4 = −1.22987e−01 A 6 = 2.69464e−02
A 8 = 4.87787e−03 A10 = −3.34934e−03
11th Surface
K = 0.00000e+00 A 4 = −1.24895e−01 A 6 = 3.36893e−02
A 8 = −5.67529e−03
13th Surface(MLS)
C 2 = 8.55017e−02 C 4 = −1.73660e−02 C 6 = 1.38018e−03
C 8 = −4.37175e−05

| | |
|---|---|
| Focal Length | 4.11 |
| Fno | 2.57 |

-continued

UNIT: mm

| | |
|---|---|
| Half Angle of View (°) | 43.35 |
| Image Height | 3.88 |
| Overall Lens Length | 5.90 |
| BF | 0.40 |

SINGLE LENS DATA

| Lens | Starting Surface | Focal Length |
|---|---|---|
| 1 | 1 | 16.93 |
| 2 | 3 | −9.73 |
| 3 | 6 | 10.00 |
| 4 | 8 | 3.32 |
| 5 | 10 | −7.88 |
| 6 | 12 | −5.85 |

Numerical Example 2

UNIT: mm

SURFACE DATA

| Surface No. | r | d | nd | νd | Effective Diameter |
|---|---|---|---|---|---|
| 1* | 16.001 | 0.44 | 1.53504 | 55.7 | 1.85 |
| 2* | 2.788 | 0.12 | | | 1.66 |
| 3* | 1.746 | 0.77 | 1.53504 | 55.7 | 1.72 |
| 4* | −3.594 | −0.07 | | | 1.72 |
| 5 (SP) | ∞ | 0.23 | | | 1.67 |
| 6* | −5.055 | 0.40 | 1.66080 | 20.4 | 1.61 |
| 7* | 55.707 | 0.19 | | | 1.91 |
| 8 (MLS) | ∞ | 0.40 | 1.51633 | 64.1 | 2.30 |
| 9 | ∞ | 0.34 | | | 2.72 |
| 10* | 2.141 | 0.40 | 1.53499 | 55.8 | 3.65 |
| 11* | 2.257 | 0.94 | | | 4.26 |
| 12* | 2.031 | 0.50 | 1.53504 | 55.7 | 4.57 |
| 13* | 1.357 | 0.43 | | | 6.01 |
| 14 | ∞ | 0.40 | 1.51633 | 64.1 | 7.31 |
| 15 | ∞ | 0.40 | | | 7.67 |
| Image Plane | ∞ | | | | |

ASPHERIC DATA

1st Surface
K = 0.00000e+00 A 4 = −1.91087e−02 A 6 = 1.37174e−03
A 8 = 3.95640e−04
2nd Surface
K = −3.18548e+00 A 4 = −2.03665e−02 A 6 = 9.72944e−03
A 8 = 1.63619e−02
3rd Surface
K = −4.74707e+00 A 4 = 4.76470e−02 A 6 = −6.23112e−02
A 8 = 6.19068e−03 A10 = −1.74582e−02
4th Surface
K = 1.00000e+01 A 4 = −9.55121e−02 A 6 = 7.92232e−02
A 8 = −4.93316e−02 A10 = 2.73523e−02
6th Surface
K = 9.96250e+00 A 4 = −1.14053e−01 A 6 = 1.84047e−01
A 8 = −3.60989e−02 A10 = 6.22275e−03
7th Surface
K = 1.99999e+01 A 4 = −7.25652e−02 A 6 = 1.37502e−01
A 8 = −5.40950e−02 A10 = 2.59535e−02
8th Surface (MLS)
C 2 = −2.50984e−02 C 4 = 8.41972e−03 C 6 = 5.93566e−04
C 8 = −7.84988e−04 C10 = −1.55749e−04
10th Surface
K = 0.00000e+00 A 4 = −9.20501e−02 A 6 = 1.21058e−02
A 8 = −2.32952e−03
11th Surface
K = 0.00000e+00 A 4 = −8.08606e−02 A 6 = 9.29348e−03
A 8 = −1.34130e−03
12th Surface

| UNIT: mm |
|---|
| K = −1.00000e+01 A 4 = −6.35885e−02 A 6 = −1.18290e−02<br>A 8 = 2.86576e−03<br>13th Surface<br>K = −4.66528e+00 A 4 = −3.78185e−02 A 6 = 2.45314e−03<br>A 8 = −9.86812e−05 |

| | |
|---|---|
| Focal Length | 4.28 |
| Fno | 2.57 |
| Half Angle of View (°) | 42.15 |
| Image Height | 3.88 |
| Overall Lens Length | 5.76 |
| BF | 1.10 |

SINGLE LENS DATA

| Lens | Starting Surface | Focal Length |
|---|---|---|
| 1 | 1 | −6.38 |
| 2 | 3 | 2.31 |
| 3 | 6 | −6.99 |
| 4 | 8 | 19.92 |
| 5 | 10 | 35.26 |
| 6 | 12 | −10.31 |

Numerical Example 3

UNIT: mm

SURFACE DATA

| Surface No. | r | d | n940 | νd | Effective Diameter |
|---|---|---|---|---|---|
| 1* | 2.085 | 0.50 | 1.83150 | 40.1 | 1.90 |
| 2* | 2.845 | 0.31 | | | 1.58 |
| 3 (SP) | ∞ | 0.10 | | | 1.53 |
| 4 | ∞ | 0.50 | 1.50792 | 64.1 | 1.50 |
| 5 (MLS) | ∞ | 0.74 | | | 1.99 |
| 6* | −24.138 | 0.45 | 1.64307 | 19.3 | 3.25 |
| 7* | −27.261 | 0.87 | | | 3.75 |
| 8* | 3.912 | 0.50 | 1.64307 | 19.3 | 5.09 |
| 9* | 3.080 | 0.33 | | | 5.71 |
| 10 | ∞ | 0.50 | 1.50792 | 64.1 | 7.34 |
| 11 | ∞ | 0.40 | | | 7.77 |
| Image Plane | ∞ | | | | |

ASPHERIC DATA

1st Surface
K = 0.00000e+00 A 4 = −8.51198e−03 A 6 = −1.87386e−03
A 8 = −8.21259e−03
2nd Surface
K = 0.00000e+00 A 4 = −8.82492e−03 A 6 = −1.39205e−02
A 8 = −1.00226e−02
5th Surface (MLS)
C 2 = −6.42581e−02 C 4 = 5.80317e−03 C 6 = 8.18128e−03
C 8 = −3.64839e−03 C10 = 5.41249e−03
6th Surface
K = 0.00000e+00 A 4 = −1.32164e−02 A 6 = 3.81982e−03
7th Surface
K = 0.00000e+00 A 4 = −1.66429e−02 A 6 = 1.04823e−02
A 8 = −1.22743e−03
8th Surface
K = 0.00000e+00 A 4 = −7.50759e−02 A 6 = 4.47157e−03
A 8 = 7.75616e−04 A10 = −7.39618e−05
9th Surface
K = 0.00000e+00 A 4 = −6.50080e−02 A 6 = 6.71184e−03
A 8 = −4.14732e−04

| | |
|---|---|
| Focal Length | 4.17 |
| Fno | 2.40 |
| Half Angle of View (°) | 42.91 |

UNIT: mm

| | |
|---|---|
| Image Height | 3.88 |
| Overall Lens Length | 5.03 |
| BF | 1.06 |

SINGLE LENS DATA

| Lens | Starting Surface | Focal Length |
|---|---|---|
| 1 | 1 | 7.22 |
| 2 | 4 | 7.78 |
| 3 | 6 | −347.26 |
| 4 | 8 | −29.43 |
| 5 | 10 | 0.00 |

Numerical Example 4

UNIT: mm

SURFACE DATA

| Surface No. | r | d | nd | νd | Effective Diameter |
|---|---|---|---|---|---|
| 1* | −3.896 | 0.50 | 1.53504 | 55.7 | 3.31 |
| 2* | −3.046 | 0.10 | | | 2.55 |
| 3* | 1.403 | 0.46 | 1.66080 | 20.4 | 2.11 |
| 4* | 1.017 | 0.29 | | | 1.64 |
| 5 (SP) | ∞ | 0.00 | | | 1.64 |
| 6* | 10.150 | 0.44 | 1.53504 | 55.7 | 1.60 |
| 7* | −10.748 | 0.11 | | | 1.63 |
| 8* | −27.778 | 0.70 | 1.53504 | 55.7 | 1.67 |
| 9* | −1.670 | 0.78 | | | 1.71 |
| 10* | 3.880 | 0.40 | 1.67070 | 19.3 | 2.61 |
| 11* | 1.944 | 1.51 | | | 3.13 |
| 12 | ∞ | 0.50 | 1.51633 | 64.1 | 6.94 |
| 13 (MLS) | ∞ | 0.40 | | | 7.62 |
| Image Plane | ∞ | | | | |

ASPHERIC DATA

1st Surface
K = 0.00000e+00 A 4 = 7.76296e−02 A 6 = −5.96239e−03
2nd Surface
K = 0.00000e+00 A 4 = 1.58973e−01 A 6 = −2.43158e−02
A 8 = 1.36084e−02
3rd Surface
K = −3.59362e+00 A 4 = 8.65247e−02 A 6 = −2.20609e−02
A 8 = 7.58096e−03
4th Surface
K = −3.07327e+00 A 4 = 8.03389e−02 A 6 = −1.81655e−02
A 8 = −2.75557e−02
6th Surface
K = 0.00000e+00 A 4 = 2.52416e−02 A 6 = −1.56320e−03
A 8 = −7.66220e−02
7th Surface
K = 0.00000e+00 A 4 = 1.48521e−01
8th Surface
K = 0.00000e+00 A 4 = 8.55980e−02 A 6 = −4.07608e−03
A 8 = 4.28876e−03
9th Surface
K = 0.00000e+00 A 4 = −1.84767e−02 A 6 = 3.70582e−03
A 8 = −5.13414e−03
10th Surface
K = 0.00000e+00 A 4 = −1.10959e−01 A 6 = 2.08304e−02
A 8 = 7.15666e−03 A10 = −3.97014e−03
11th Surface
K = 0.00000e+00 A 4 = −1.21890e−01 A 6 = 3.34359e−02
A 8 = −6.00247e−03
13th Surface (MLS)
C 2 = 7.06468e−02 C 4 = −1.63034e−02 C 6 = 1.36101e−03
C 8 = −4.39037e−05

-continued

| UNIT: mm | |
|---|---|
| Focal Length | 4.39 |
| Fno | 2.57 |
| Half Angle of View (°) | 41.42 |
| Image Height | 3.88 |
| Overall Lens Length | 6.20 |
| BF | 0.40 |

SINGLE LENS DATA

| Lens | Starting Surface | Focal Length |
|---|---|---|
| 1 | 1 | 21.65 |
| 2 | 3 | −10.68 |
| 3 | 6 | 9.83 |
| 4 | 8 | 3.29 |
| 5 | 10 | −6.33 |
| 6 | 12 | −7.08 |

TABLE I below summarizes various values of inequalities in each example.

TABLE 1

| | | | Ex. 1 | Ex. 2 | Ex. 3 | Ex. 4 |
|---|---|---|---|---|---|---|
| | | f | 4.10552 | 4.28153 | 4.16875 | 4.39253 |
| | | fp | 16.93153 | 2.31351 | 7.22043 | 21.65056 |
| | | | 10.00000 | 35.26270 | | 9.82961 |
| | | | 3.31592 | | | 3.29038 |
| | | fN | −9.73082 | −6.38453 | −29.43124 | −10.67748 |
| | | | −7.87990 | −6.99484 | | −6.33450 |
| | | | | −10.30905 | | |
| | | fM | −5.84784 | 19.92157 | 7.78112 | −7.07746 |
| | r | Critical Point | 2.04170 | | | 1.84590 |
| | | Inflection Point | 1.00580 | 0.71350 | 0.749 | 0.9342 |
| | | D | 7.61252 | 2.29962 | 1.98919 | 7.61605 |
| | | H | 0.00145 | 0.00084 | 0.00145 | 0.00084 |
| | | λ | 0.00094 | 0.00058756 | 0.00094 | 0.00058756 |
| | | rmax | 0.000685 | 0.000335 | 0.000607 | 0.000367 |
| | | rmin | 0.000200 | 0.000100 | 0.00018 | 0.000180 |
| Inequality (1) | r/D | Critical Point | 0.268 | | | 0.242 |
| | | Inflection Point | 0.132 | 0.310 | 0.377 | 0.123 |
| (2) | | \|fM\|/f | 1.424 | 4.653 | 1.867 | 1.611 |
| (3) | | fP/f | 4.124 | 0.540 | 1.732 | 4.929 |
| | | | 2.436 | 8.236 | | 2.238 |
| | | | 0.808 | | | 0.749 |
| (4) | | fN/f | −2.370 | −1.491 | −7.060 | −2.431 |
| | | | −1.919 | −1.634 | | −1.442 |
| | | | | −2.408 | | |
| (5) | | H/λ | 1.543 | 1.430 | 1.543 | 1.430 |
| (6) | | rmax/λ | 0.729 | 0.570 | 0.646 | 0.625 |
| (7) | | rmin/λ | 0.213 | 0.170 | 0.191 | 0.306 |

Image Pickup Apparatus

Figure 27:
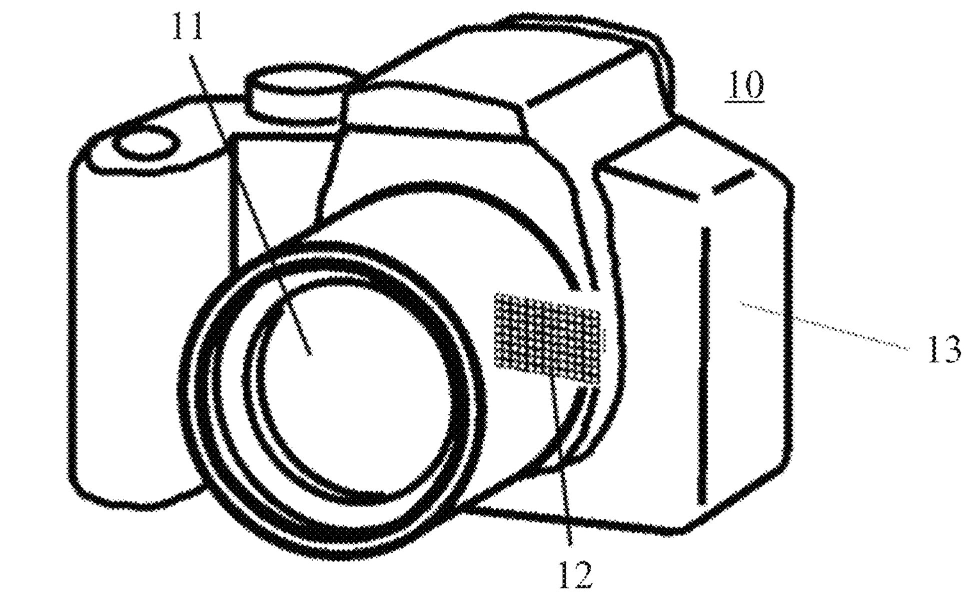
FIG. 27 is a schematic diagram of an image pickup apparatus.

Referring now to FIG. 27, a description will now be given of a digital still camera (image pickup apparatus) using the optical system L0 according to any one of Examples 1 to 4 as an imaging optical system. In FIG. 27, reference numeral 10 denotes a camera body, and reference numeral 11 denotes an imaging optical system that includes the optical system L0 according to any one of Examples 1 to 4. Reference numeral 12 denotes an image sensor (photoelectric conversion element), such as a CCD sensor or a CMOS sensor, which is built into the camera body 10, receives an optical image formed by the imaging optical system 11, and photoelectrically converts it. The camera body 10 may be a so-called single-lens reflex camera that has a quick turn mirror, or a so-called mirrorless camera that has no quick turn mirror. The quality of the output image may be improved by electrically correcting various aberrations such as distortion and chromatic aberration in an image acquired by the image sensor 12.

Applying the optical system L0 according to each example to an image pickup apparatus such as a digital still camera can provide an image pickup apparatus with a small lens.

Lens Apparatus

Figure 28:
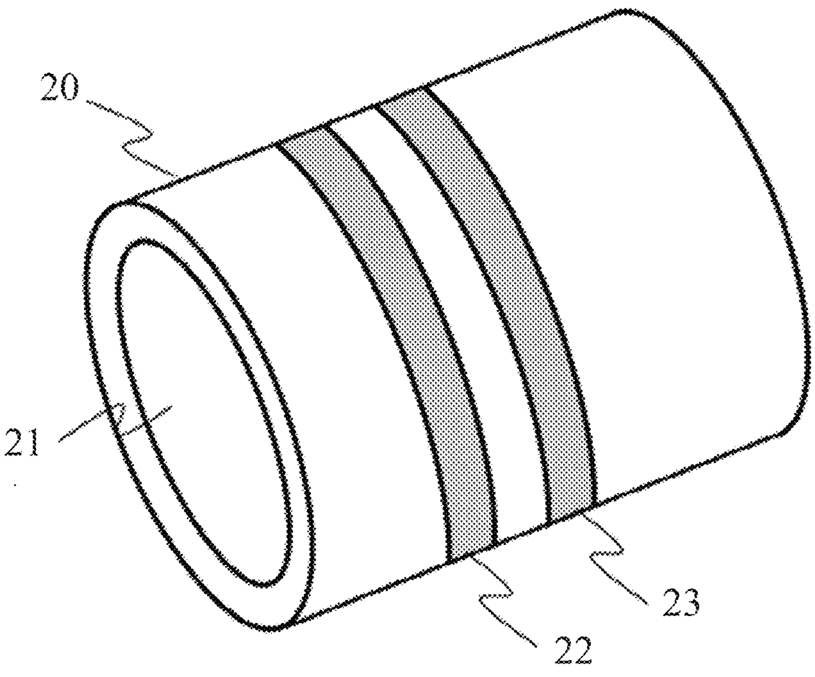
FIG. 28 is a schematic diagram of a lens apparatus.

FIG. 28 is a schematic external view of a lens apparatus 20 using the optical system L0 according to any one of Examples 1 to 4 as an imaging optical system. The lens apparatus 20 is a so-called interchangeable lens that is attachable to and detachable from an unillustrated camera body. Reference numeral 21 denotes an imaging optical system that includes the optical system L0 according to any one of Examples 1 to 4. The imaging optical system 21 is held by an unillustrated holder. The lens apparatus 20 includes a focus operation unit 22 and an operation unit 23 configured to change an imaging mode.

When the user operates the focus operation unit 22, the arrangement of the imaging optical system 21 can be mechanically or electrically changed, and a focal position can be changed.

By the user operating the operation unit 23, the arrangement of the lens units in the imaging optical system 21 may be changed for purposes other than focusing. For example, the aberration of the imaging optical system 21 may be changed by mechanically or electrically changing the arrangement of the lens units in the imaging optical system 21 in accordance with the operation of the operation unit 23. At this time, the focus position may not substantially change.

Each example can provide an optical system that is compact and can satisfactorily correct various aberrations from the center of an image to the periphery of the image.

While the disclosure has described example embodiments, it is to be understood that some embodiments are not limited to the disclosed embodiments. The scope of the following claims is to be accorded the broadest interpretation so as to encompass all such modifications and equivalent structures and functions.

This application claims priority to Japanese Patent Application No. 2023-093642, which was filed on Jun. 7, 2023, and which is hereby incorporated by reference herein in its entirety.

What is claimed is:

1. An optical system comprising:

at least one positive lens; and a meta-lens having a meta-lens surface that generates a phase change in a wavefront of light passing through the meta-lens, wherein a phase function of the meta-lens surface, representing a phase change amount on the wavefront corresponding to a position in a radial direction of the meta-lens, includes an inflection point, and wherein the following inequality is satisfied:

$$0.1 < fP/f < 10.0$$

where f is a focal length of the optical system, and fP is a focal length of the positive lens.

2. The optical system according to claim 1, wherein the following inequality is satisfied:

$$0.050 < r/D < 0.425$$

where r is a distance from a center of the meta-lens surface in the radial direction of the meta-lens to a position in the radial direction of the meta-lens corresponding to the inflection point included in the phase function, and D is an effective diameter of the meta-lens surface.

3. The optical system according to claim 1, wherein the meta-lens surface includes a structure that includes a plurality of convex portions, and wherein a size of each convex portion changes in the radial direction according to a predetermined rule.

4. The optical system according to claim 3, wherein the size of the convex portion of the optical system is determined by at least one of a filling rate of the convex portion, a volume of the convex portion, a diameter of the convex portion, and an area of the convex portion on the meta-lens surface.

5. The optical system according to claim 3, wherein in the structure, the convex portions are provided such that the size of each convex portion increases or decreases as a position moves away from a center of the meta-lens surface in the radial direction.

6. The optical system according to claim 5, wherein the structure is periodically provided along the radial direction.

7. The optical system according to claim 3, wherein the meta-lens surface includes a plurality of structures, in each of which the convex portions are provided such that the size of each convex portion increases or decreases as a position moves away from a center of the meta-lens surface in the radial direction, wherein the plurality of structures include a first structure and a second structure, and wherein a distance in the radial direction of the first structure is different from that of the second structure.

8. The optical system according to claim 7, wherein in at least a part of the meta-lens surface, distances of the plurality of structures in the radial direction become shorter as the position moves away from the center, and then become longer as the position moves away from the center.

9. The optical system according to claim 3, wherein the meta-lens surface includes a plurality of structures, in each of which the convex portions are provided such that the size of each convex portion increases or decreases as a position moves away from a center of the meta-lens surface in the radial direction, wherein the plurality of structures include a first structure and a second structure, and wherein a size change in the radial direction of the first structure is different from that of the second structure.

10. The optical system according to claim 9, wherein on at least a part of the meta-lens surface, the first structure is periodically repeated in the radial direction, and the second structure is periodically repeated in the radial direction.

11. The optical system according to claim 3, wherein each convex portion has a columnar shape having two substantially similar and substantially parallel planar figures on a top surface and a bottom surface.

12. The optical system according to claim 1, wherein the following inequality is satisfied:

$$0.1 < |fM|/f < 10.0$$

where fM is a focal length of the meta-lens.

13. The optical system according to claim 1, wherein the at least one lens includes at least one negative lens, and the following inequality is satisfied:

$$-10.0 < fN/f < -0.1$$

where fN is a focal length of the negative lens.

14. The optical system according to claim 3, wherein the following inequality is satisfied:

$$1.0 < H/\lambda < 3.0$$

where H is a maximum height among heights of the convex portions in a direction along an optical axis, and λ is a designed wavelength.

15. The optical system according to claim 3, wherein the following inequalities are satisfied:

$$0.3 < r\text{max}/\lambda < 0.9$$

$$0.05 < r\text{min}/\lambda < 0.50$$

where rmax and rmin are a maximum diameter and a minimum diameter of the plurality of convex portions, respectively, and λ is a designed wavelength.

16. The optical system according to claim 1, wherein the at least one lens includes at least one aspherical lens, and wherein the aspherical lens has an aspherical surface including an inflection point.

17. An optical system comprising:

at least one positive lens; and a meta-lens having a meta-lens surface that generates a phase change in a wavefront of light passing through the meta-lens, wherein the meta-lens surface includes a structure that includes a plurality of convex portions, wherein a size of each convex portion changes in a radial direction according to a predetermined rule, and wherein the following inequality is satisfied:

$$0.1<fP/f<10.0$$

where f is a focal length of the optical system, and fP is a focal length of the positive lens.

18. An optical system comprising:

at least one positive lens; and a meta-lens having a meta-lens surface that generates a phase change in a wavefront of light passing through the meta-lens, wherein a phase function of the meta-lens surface, representing a phase change amount on the wavefront corresponding to a position in a radial direction of the meta-lens, includes a critical point in a peripheral portion in the radial direction, and wherein the following inequality is satisfied:

$$0.1<fP/f<10.0$$

where f is a focal length of the optical system, and fP is a focal length of the positive lens.

19. An optical element comprising:

a meta-lens surface that generates a phase change in a wavefront of light passing through the optical element, wherein a phase function of the meta-lens surface, representing a phase change amount on the wavefront corresponding to a position in a radial direction of the meta-lens surface, includes an inflection point, and wherein the following inequality is satisfied:

$$0.1<|fM|/f<10.0$$

where f is a focal length of an optical system, and fM is a focal length of the optical element.

20. An image pickup apparatus comprising:

the optical system according to claim 1; and an image sensor configured to receive an image formed by the optical system.

21. A lens apparatus comprising:

the optical system according to claim 1; and a holder configured to hold the optical system.

* * * * *